(12) United States Patent
Marriott

(10) Patent No.: US 7,706,637 B2
(45) Date of Patent: Apr. 27, 2010

(54) HOST CONFIGURED FOR INTEROPERATION WITH COUPLED PORTABLE MEDIA PLAYER DEVICE

(75) Inventor: Greg Marriott, Honolulu, HI (US)

(73) Assignee: Apple Inc., Cupertino, CA (US)

(*) Notice: Subject to any disclaimer, the term of this patent is extended or adjusted under 35 U.S.C. 154(b) by 882 days.

(21) Appl. No.: 11/535,646

(22) Filed: Sep. 27, 2006

(65) Prior Publication Data

US 2007/0033295 A1 Feb. 8, 2007

Related U.S. Application Data

(63) Continuation-in-part of application No. 10/973,657, filed on Oct. 25, 2004, now Pat. No. 7,433,546.

(60) Provisional application No. 60/728,812, filed on Oct. 19, 2005.

(51) Int. Cl.
 G06K 9/54 (2006.01)
 G06K 9/36 (2006.01)
 G06F 15/16 (2006.01)
(52) U.S. Cl. .................. 382/305; 382/276; 709/232
(58) Field of Classification Search ............... 382/305, 382/312, 276; 707/101; 717/109; 711/133; 715/501.1; 455/426.1; 713/165; 709/248, 709/232
 See application file for complete search history.

(56) References Cited

U.S. PATENT DOCUMENTS

| | | | |
|---|---|---|---|
| 4,090,216 A | 5/1978 | Constable | |
| 4,386,345 A | 5/1983 | Narveson et al. | |
| 4,451,849 A | 5/1984 | Fuhrer | |
| 4,589,022 A | 5/1986 | Prince et al. | |
| 4,908,523 A | 3/1990 | Snowden et al. | |
| 4,928,307 A | 5/1990 | Lynn | |
| 4,951,171 A | 8/1990 | Tran et al. | |
| 5,185,906 A | 2/1993 | Brooks | |
| 5,293,494 A | 3/1994 | Saito et al. | |
| 5,379,057 A | 1/1995 | Clough | |
| 5,406,305 A | 4/1995 | Shimomura et al. | |
| 5,559,945 A | 9/1996 | Beaudet et al. | |
| 5,566,337 A | 10/1996 | Szymanski et al. | |
| 5,583,993 A | 12/1996 | Foster et al. | |
| 5,608,698 A | 3/1997 | Yamanoi et al. | |

(Continued)

FOREIGN PATENT DOCUMENTS

DE 43 34 773 A1 4/1994

(Continued)

OTHER PUBLICATIONS

Apple iTunes Smart Playlists, downloaded Apr. 5, 2005 from http://web.archive.org/web/20031002011316/www.apple.com/itunes/smartplaylists . . . pp. 1-2.

(Continued)

Primary Examiner—Kanji Patel
(74) Attorney, Agent, or Firm—Beyer Law Group LLP

(57) ABSTRACT

Methods and system for transferring images between devices is disclosed. For example, differently scaled images by a host device may automatically and/or selectively be transferred to a media player for display. In turn, appropriately scaled images may be transferred automatically and/or selectively to another display device for example a TV, camera or printer. The selectivity may occur either at the host level or at the player level.

38 Claims, 12 Drawing Sheets

U.S. PATENT DOCUMENTS

| | | |
|---|---|---|
| 5,616,876 A | 4/1997 | Cluts |
| 5,617,386 A | 4/1997 | Choi |
| 5,670,985 A | 9/1997 | Cappels, Sr. et al. |
| 5,675,362 A | 10/1997 | Clough |
| 5,684,513 A | 11/1997 | Decker |
| 5,710,922 A | 1/1998 | Alley et al. |
| 5,712,949 A | 1/1998 | Kato et al. |
| 5,717,422 A | 2/1998 | Fergason |
| 5,721,949 A | 2/1998 | Smith et al. |
| 5,726,672 A | 3/1998 | Hernandez et al. |
| 5,739,451 A | 4/1998 | Winksy et al. |
| 5,740,143 A | 4/1998 | Suetomi |
| 5,760,588 A | 6/1998 | Bailey |
| 5,778,374 A | 7/1998 | Dang et al. |
| 5,803,786 A | 9/1998 | McCormick |
| 5,815,225 A | 9/1998 | Nelson |
| 5,822,288 A | 10/1998 | Shinada |
| 5,835,721 A | 11/1998 | Donahue et al. |
| 5,835,732 A | 11/1998 | Kikinis et al. |
| 5,838,969 A | 11/1998 | Jacklin et al. |
| 5,864,868 A | 1/1999 | Contois |
| 5,867,163 A | 2/1999 | Kurtenbach |
| 5,870,710 A | 2/1999 | Ozawa et al. |
| 5,918,303 A | 6/1999 | Yamaura et al. |
| 5,920,728 A | 7/1999 | Hallowell et al. |
| 5,923,757 A | 7/1999 | Hocker et al. |
| 5,952,992 A | 9/1999 | Helms |
| 6,006,274 A | 12/1999 | Hawkins et al. |
| 6,009,237 A | 12/1999 | Hirabayashi et al. |
| 6,011,585 A | 1/2000 | Anderson |
| 6,018,705 A | 1/2000 | Gaudet et al. |
| 6,041,023 A | 3/2000 | Lakhansingh |
| 6,052,654 A | 4/2000 | Gaudet et al. |
| 6,108,426 A | 8/2000 | Stortz |
| 6,122,340 A | 9/2000 | Darley et al. |
| 6,158,019 A | 12/2000 | Squibb |
| 6,161,944 A | 12/2000 | Leman |
| 6,172,948 B1 | 1/2001 | Keller et al. |
| 6,179,432 B1 | 1/2001 | Zhang et al. |
| 6,185,163 B1 | 2/2001 | Bickford et al. |
| 6,191,939 B1 | 2/2001 | Burnett |
| 6,208,044 B1 | 3/2001 | Viswanadham et al. |
| 6,216,131 B1 | 4/2001 | Liu et al. |
| 6,217,183 B1 | 4/2001 | Shipman |
| 6,248,946 B1 | 6/2001 | Dwek |
| 6,295,541 B1 | 9/2001 | Bodnar et al. |
| 6,298,314 B1 | 10/2001 | Blackadar et al. |
| 6,332,175 B1 | 12/2001 | Birrell et al. |
| 6,336,365 B1 | 1/2002 | Blackadar et al. |
| 6,336,727 B1 | 1/2002 | Kim |
| 6,341,316 B1 | 1/2002 | Kloba et al. |
| 6,357,147 B1 | 3/2002 | Darley et al. |
| 6,377,530 B1 | 4/2002 | Burrows |
| 6,452,610 B1 | 9/2002 | Reinhardt et al. |
| 6,467,924 B2 | 10/2002 | Shipman |
| 6,493,652 B1 | 12/2002 | Ohlenbusch et al. |
| 6,536,139 B2 | 3/2003 | Darley et al. |
| 6,549,497 B2 | 4/2003 | Miyamoto et al. |
| 6,560,903 B1 | 5/2003 | Darley |
| 6,587,403 B1 | 7/2003 | Keller et al. |
| 6,587,404 B1 | 7/2003 | Keller et al. |
| 6,605,038 B1 | 8/2003 | Teller et al. |
| 6,606,281 B2 | 8/2003 | Cowgill et al. |
| 6,611,607 B1 * | 8/2003 | Davis et al. ................. 382/100 |
| 6,611,789 B1 | 8/2003 | Darley |
| 6,617,963 B1 | 9/2003 | Watters et al. |
| 6,621,768 B1 | 9/2003 | Keller et al. |
| 6,623,427 B2 | 9/2003 | Mandigo |
| 6,631,101 B1 | 10/2003 | Chan et al. |
| 6,693,612 B1 | 2/2004 | Matsumoto et al. |
| 6,731,312 B2 | 5/2004 | Robbin |
| 6,760,536 B1 | 7/2004 | Amir et al. |
| 6,762,741 B2 | 7/2004 | Weindorf |
| 6,794,566 B2 | 9/2004 | Pachet |
| 6,799,226 B1 | 9/2004 | Robbin et al. |
| 6,801,964 B1 | 10/2004 | Mahdavi |
| 6,832,373 B2 | 12/2004 | O'Neill |
| 6,870,529 B1 | 3/2005 | Davis |
| 6,871,063 B1 | 3/2005 | Schiffer |
| 6,876,947 B1 | 4/2005 | Darley et al. |
| 6,882,955 B1 | 4/2005 | Ohlenbusch et al. |
| 6,898,550 B1 | 5/2005 | Blackadar et al. |
| 6,911,971 B2 | 6/2005 | Suzuki et al. |
| 6,918,677 B2 | 7/2005 | Shipman |
| 6,931,377 B1 | 8/2005 | Seya |
| 6,934,812 B1 | 8/2005 | Robbin et al. |
| 6,950,087 B2 | 9/2005 | Knox et al. |
| 7,028,096 B1 | 4/2006 | Lee |
| 7,046,230 B2 | 5/2006 | Zadesky |
| 7,062,225 B2 | 6/2006 | White |
| 7,076,561 B1 | 7/2006 | Rosenberg et al. |
| 7,084,856 B2 | 8/2006 | Huppi |
| 7,084,921 B1 | 8/2006 | Ogawa |
| 7,092,946 B2 | 8/2006 | Bodnar |
| 7,124,125 B2 | 10/2006 | Cook et al. |
| 7,131,059 B2 * | 10/2006 | Obrador ..................... 715/209 |
| 7,143,241 B2 | 11/2006 | Hull |
| 7,146,437 B2 | 12/2006 | Robbin et al. |
| 7,171,331 B2 | 1/2007 | Vock et al. |
| 7,191,244 B2 | 3/2007 | Jennings et al. |
| 7,213,228 B2 | 5/2007 | Putterman et al. |
| 7,234,026 B2 | 6/2007 | Robbin et al. |
| 7,277,928 B2 | 10/2007 | Lennon |
| 7,301,857 B2 | 11/2007 | Shah et al. |
| 7,356,679 B1 | 4/2008 | Le et al. |
| 7,508,535 B2 | 3/2009 | Hart et al. |
| 2001/0013983 A1 | 8/2001 | Izawa et al. |
| 2001/0029178 A1 | 10/2001 | Criss et al. |
| 2001/0037367 A1 | 11/2001 | Iyer |
| 2001/0041021 A1 | 11/2001 | Boyle et al. |
| 2001/0042107 A1 | 11/2001 | Palm |
| 2002/0002413 A1 | 1/2002 | Tokue |
| 2002/0013784 A1 | 1/2002 | Swanson |
| 2002/0028683 A1 | 3/2002 | Banatre et al. |
| 2002/0045961 A1 | 4/2002 | Gibbs et al. |
| 2002/0046315 A1 | 4/2002 | Miller et al. |
| 2002/0055934 A1 | 5/2002 | Lipscomb et al. |
| 2002/0059440 A1 | 5/2002 | Hudson et al. |
| 2002/0059499 A1 | 5/2002 | Hudson |
| 2002/0090912 A1 | 7/2002 | Cannon et al. |
| 2002/0116082 A1 | 8/2002 | Gudorf |
| 2002/0116517 A1 | 8/2002 | Hudson et al. |
| 2002/0123359 A1 | 9/2002 | Wei et al. |
| 2002/0152045 A1 | 10/2002 | Dowling et al. |
| 2002/0156833 A1 | 10/2002 | Maurya et al. |
| 2002/0161865 A1 | 10/2002 | Nguyen |
| 2002/0173273 A1 | 11/2002 | Spurgat et al. |
| 2002/0189426 A1 | 12/2002 | Hirade et al. |
| 2002/0189429 A1 | 12/2002 | Qian et al. |
| 2002/0199043 A1 | 12/2002 | Yin |
| 2003/0007001 A1 | 1/2003 | Zimmerman |
| 2003/0018799 A1 | 1/2003 | Eyal |
| 2003/0037254 A1 | 2/2003 | Fischer et al. |
| 2003/0046434 A1 | 3/2003 | Flanagin et al. |
| 2003/0050092 A1 | 3/2003 | Yun |
| 2003/0074457 A1 | 4/2003 | Kluth |
| 2003/0076301 A1 | 4/2003 | Tsuk et al. |
| 2003/0076306 A1 | 4/2003 | Zadesky |
| 2003/0079038 A1 | 4/2003 | Robbin et al. |
| 2003/0095096 A1 | 5/2003 | Robbin et al. |
| 2003/0097379 A1 | 5/2003 | Ireton |
| 2003/0104835 A1 | 6/2003 | Douhet |
| 2003/0128192 A1 | 7/2003 | van Os |
| 2003/0133694 A1 | 7/2003 | Yeo |

| | | | |
|---|---|---|---|
| 2003/0153213 A1 | 8/2003 | Siddiqui et al. |
| 2003/0156503 A1 | 8/2003 | Schilling et al. |
| 2003/0167318 A1 | 9/2003 | Robbin et al. |
| 2003/0176935 A1 | 9/2003 | Lian et al. |
| 2003/0229490 A1 | 12/2003 | Etter |
| 2004/0001395 A1 | 1/2004 | Keller et al. |
| 2004/0001396 A1 | 1/2004 | Keller et al. |
| 2004/0012556 A1 | 1/2004 | Yong et al. |
| 2004/0055446 A1 | 3/2004 | Robbin et al. |
| 2004/0069122 A1 | 4/2004 | Wilson |
| 2004/0076086 A1 | 4/2004 | Keller |
| 2004/0086120 A1 | 5/2004 | Akins, III et al. |
| 2004/0094018 A1 | 5/2004 | Ueshima et al. |
| 2004/0103411 A1 | 5/2004 | Thayer |
| 2004/0125522 A1 | 7/2004 | Chiu et al. |
| 2004/0165302 A1 | 8/2004 | Lu |
| 2004/0177063 A1 | 9/2004 | Weber et al. |
| 2004/0198436 A1 | 10/2004 | Alden |
| 2004/0210628 A1 | 10/2004 | Inkinen et al. |
| 2004/0224638 A1 | 11/2004 | Fadell et al. |
| 2004/0242224 A1* | 12/2004 | Janik et al. ............... 455/426.1 |
| 2004/0255135 A1* | 12/2004 | Kitaya et al. ............. 713/193 |
| 2004/0267825 A1 | 12/2004 | Novak et al. |
| 2005/0015254 A1 | 1/2005 | Beaman |
| 2005/0053365 A1 | 3/2005 | Adams et al. |
| 2005/0060240 A1* | 3/2005 | Popofsky ................... 705/26 |
| 2005/0060542 A1* | 3/2005 | Risan et al. ............... 713/165 |
| 2005/0108754 A1 | 5/2005 | Carhart et al. |
| 2005/0111820 A1 | 5/2005 | Matsumi et al. |
| 2005/0122315 A1 | 6/2005 | Chalk et al. |
| 2005/0123886 A1 | 6/2005 | Ilua et al. |
| 2005/0146534 A1 | 7/2005 | Fong et al. |
| 2005/0152294 A1 | 7/2005 | Yu et al. |
| 2005/0160270 A1 | 7/2005 | Goldberg et al. |
| 2005/0166153 A1 | 7/2005 | Eytchison et al. |
| 2005/0234983 A1 | 10/2005 | Plastina et al. |
| 2005/0245839 A1 | 11/2005 | Stivoric et al. |
| 2005/0248555 A1 | 11/2005 | Feng et al. |
| 2005/0257169 A1 | 11/2005 | Tu |
| 2005/0259064 A1 | 11/2005 | Sugino et al. |
| 2005/0259524 A1 | 11/2005 | Yeh |
| 2005/0270276 A1 | 12/2005 | Sugimoto et al. |
| 2006/0013414 A1 | 1/2006 | Shih |
| 2006/0025068 A1 | 2/2006 | Regan et al. |
| 2006/0068760 A1 | 3/2006 | Hameed et al. |
| 2006/0088228 A1 | 4/2006 | Marriott et al. |
| 2006/0094409 A1 | 5/2006 | Inselberg |
| 2006/0095502 A1 | 5/2006 | Lewis et al. |
| 2006/0098320 A1 | 5/2006 | Koga et al. |
| 2006/0135883 A1 | 6/2006 | Jonsson et al. |
| 2006/0152382 A1 | 7/2006 | Hiltunen |
| 2006/0155914 A1 | 7/2006 | Jobs et al. |
| 2006/0170535 A1 | 8/2006 | Watters et al. |
| 2006/0173974 A1 | 8/2006 | Tang |
| 2006/0190577 A1 | 8/2006 | Yamada |
| 2006/0190980 A1* | 8/2006 | Kikkoji et al. ............. 725/114 |
| 2006/0221057 A1 | 10/2006 | Fux et al. |
| 2006/0221788 A1 | 10/2006 | Lindahl et al. |
| 2006/0259758 A1 | 11/2006 | Deng et al. |
| 2006/0265503 A1 | 11/2006 | Jones et al. |
| 2006/0272483 A1 | 12/2006 | Honeywell |
| 2007/0014536 A1 | 1/2007 | Hellman |
| 2007/0028009 A1 | 2/2007 | Robbin et al. |
| 2007/0061759 A1 | 3/2007 | Klein, Jr. |
| 2007/0106660 A1 | 5/2007 | Stern et al. |
| 2007/0124679 A1 | 5/2007 | Jeong et al. |
| 2007/0129062 A1 | 6/2007 | Pantalone et al. |
| 2007/0135225 A1 | 6/2007 | Nieminen et al. |
| 2007/0248311 A1 | 10/2007 | Wice et al. |
| 2007/0255163 A1 | 11/2007 | Prineppi |
| 2008/0055228 A1 | 3/2008 | Glen |
| 2008/0134287 A1 | 6/2008 | Gudorf et al. |

FOREIGN PATENT DOCUMENTS

| | | |
|---|---|---|
| DE | 44 45 023 A1 | 6/1996 |
| EP | 0 127 139 | 5/1984 |
| EP | 0578604 | 1/1994 |
| EP | 0 757 437 | 2/1997 |
| EP | 0 813 138 | 12/1997 |
| EP | 0 863 469 | 9/1998 |
| EP | 0 917 077 | 5/1999 |
| EP | 0 982 732 | 3/2000 |
| EP | 1 028 425 | 8/2000 |
| EP | 1028426 A2 | 8/2000 |
| EP | 1 076 302 | 2/2001 |
| EP | 1 289 197 | 3/2003 |
| EP | 1 503 363 | 2/2005 |
| EP | 1536612 | 6/2005 |
| EP | 1 566 743 | 8/2005 |
| EP | 1566948 | 8/2005 |
| EP | 1 372 133 | 12/2005 |
| EP | 1 213 643 | 6/2006 |
| EP | 1 686 496 | 8/2006 |
| GB | 2 370 208 | 6/2002 |
| GB | 2384399 | 7/2003 |
| JP | 59-023610 | 2/1984 |
| JP | 03-228490 | 10/1991 |
| JP | 04-243386 | 8/1992 |
| JP | 6-96520 | 4/1994 |
| JP | 8-235774 | 9/1996 |
| JP | 9-50676 | 2/1997 |
| JP | 9-259532 | 10/1997 |
| JP | 2000-90651 | 3/2000 |
| JP | 2000-224099 | 8/2000 |
| JP | 2000-285643 | 10/2000 |
| JP | 2000-299834 | 10/2000 |
| JP | 2000-311352 | 11/2000 |
| JP | 2000-339864 | 12/2000 |
| JP | 2001-236286 | 8/2001 |
| JP | 2001-312338 | 11/2001 |
| JP | 2002-076977 | 3/2002 |
| JP | 2002-175467 | 6/2002 |
| JP | 2003-188792 | 7/2003 |
| JP | 2003-259333 | 9/2003 |
| JP | 2003-319365 | 11/2003 |
| JP | 2004-021720 | 1/2004 |
| JP | 2004-220420 | 2/2004 |
| JP | 2004-219731 | 8/2004 |
| KR | 20010076508 | 8/2001 |
| WO | WO 01/33569 | 6/1995 |
| WO | WO 95/16950 | 6/1995 |
| WO | 98/17032 | 4/1998 |
| WO | WO 99/28813 | 6/1999 |
| WO | WO 00/22820 | 4/2000 |
| WO | WO 01/65413 | 9/2001 |
| WO | WO 01/67753 | 9/2001 |
| WO | WO 02/25610 | 3/2002 |
| WO | WO 03/023786 | 3/2003 |
| WO | WO 03/036457 | 5/2003 |
| WO | WO 03/067202 | 8/2003 |
| WO | 2004/061850 A1 | 7/2004 |
| WO | WO 2004/055637 | 7/2004 |
| WO | WO2004/084413 A2 | 9/2004 |
| WO | WO 2004/104815 | 12/2004 |
| WO | WO 2005/031737 | 4/2005 |
| WO | 2005/048644 | 5/2005 |
| WO | WO 2005/008505 | 7/2005 |
| WO | 2005/109781 | 11/2005 |
| WO | WO 2006/040737 | 4/2006 |

WO  2006/071364  6/2006

OTHER PUBLICATIONS

International Search Report dated Dec. 5, 2007 in Patent Application No. PCT/US2007/004810.
International Search Report in Patent Application No. PCT/US2006/048738 dated Jan. 29, 2008.
International Search Report in Patent Application No. PCT/US2007/077020 dated Jan. 28, 2008.
International Search Report in Patent Application No. PCT/US2007/076889 dated Jan. 28, 2008.
iTunes, Wikipedia, the free encyclopedia; downloaded on Oct. 5, 2005, pp. 1-6.
Nutzel et al., "Sharing Systems for Future HiFi Systems", The Computer Society, Jun. 2004.
Partial Search Report dated Sep. 6, 2007 in Patent Application No. PCT/US2007/004810.
Written Opinion dated Dec. 5, 2007 in Patent Application No. PCT/US2007/004810.
Written Opinion in Patent Application No. PCT/US2006/048738 dated Jan. 29, 2008.
Written Opinion in Patent Application No. PCT/US2007/076889 dated Jan. 28, 2008.
Written Opinion in Patent Application No. PCT/US2007/077020 dated Jan. 28, 2008.
Office Action dated Feb. 1, 2008 in Patent Application No. 11/327,544.
Hart-Daves, Guy, "How to Do Everything with Your iPod and iPod Mini", 2004, McGraw-Hill Professional, p. 33.
Office Action dated Feb. 4, 2008 in Patent Application No. 11/566,072.
"Creative liefert erstes Portable Media Center aus" [Online] Sep. 2, 2004, Retrieved from the internet on Sep. 20, 2007 from http://www.golem.de/0409/33347.html>.
International Search Report dated Feb. 18, 2008 in Patent Application No. PCT/US2007/079766.
International Search Report Dated Sep. 27, 2007 in Application No. 05824296.7.
Office Action dated Feb. 20, 2008 in Japanese Application No. 2007-538196.
Office Action dated Feb. 25, 2008 in U.S. Appl. No. 11/749,599.
Office Action dated Mar. 4, 2008 from U.S. Appl. No. 10/973,657.
Partial International Search Report dated Feb. 1, 2008 in Patent Application No. PCT/US2007/010630.
Written Opinion dated Feb. 18, 2008 in Patent Application No. PCT/US2007/079766.
Office Action dated Apr. 4, 2008 in U.S. Appl. No. 11/212,555.
Search Report dated Mar. 20, 2008 in Patent Application No. PCT/US2007/077789.
Written Opinion dated Mar. 20, 2008 in Patent Application No. PCT/US2007/077789.
Invitation to Pay Additional Fees and Partial Search Report for PCT Application No. PCT/US2007/077160 dated Apr. 1, 2008.
"Combination Belt Clip Leaf Spring and Housing Latch", Wandt et al.; Motorla Technical Developments, Motorla Inc. Schaumburg, IL. vol. 18, Mar. 1, 1993.
Notification of Reason for Rejection from PCT Application No. 2003-539048 dated Nov. 27, 2007.
"Creative Zen Vision: M 30GB", Dec. 21, 2005; downloaded on Jan. 11, 2008 from http://web.archive.org/web/20051221050140/http://www.everthingusb.com/creative_zen_vision:m_30gb.html>.
International Search Report dated Jul. 7, 2008 in PCT Application No. PCT/US2007/076793.
International Search Report dated Jun. 10, 2008 in PCT Application No. PCT/US2007/010630.
Office Action dated Jun. 17, 2008 in Patent Application No. 11/212,313.
Office Action dated May 30, 2008 in Chinese Patent Application No. 02825938.6.
Office Action in Japanese Patent Application No. 2008-045351 dated Aug. 5, 2008.
Office Action in U.S. Appl. No. 11/212,555 dated Aug. 14, 2008.

Search Report dated May 15, 2008 in PCT Application No. PCT/US2007/019578.
Written Opinion dated Jul. 7, 2008 in PCT Application No. PCT/US2007/076793.
Written Opinion dated Jun. 10, 2008 in PCT Application No. PCT/US2007/010630.
Written Opinion dated May 15, 2008 in PCT Application No. PCT/US2007/019578.
Yee et al., "Faceted Metadata for Image Search and Browsing." Association For Computing Machinery, Conference Proceedings, Apr. 5, 2003.
"12.1" 925 Candela Mobile PC", downloaded from LCDHardware.com on Dec. 19, 2002, http://www.lcdharware.com/panel/12_1_panel/default.asp.
"BL82 Series Backlit Keyboards", www.tg3electronics.com/products/backlit/backlit.htm, downloaded Dec. 19, 2002.
"Bluetooth PC Headsets—Enjoy Wireless VoIP Conversations: 'Connecting' Your Bluetooth Headset With Your Computer", Bluetooth PC Headsets; downloaded on Apr. 29, 2006 from http://www.bluetoothpcheadsets.com/connect.htm.
"Creative MuVo TX 256 MB," T3 Magazine, Aug. 17, 2004, http://www.t3.co.uk/reviews/entertainment/mp3_player/creative_muvo_tx_256mb [downloaded Jun. 6, 2006].
"Eluminx Illuminated Keyboard", downloaded Dec. 19, 2002, http://www.elumix.com/.
"How to Pair a Bluetooth Headset & Cell Phone", About.com; downloaded on Apr. 29, 2006 from http://mobileoffice.about.com/od/usingyourphone/ht/blueheadset_p.htm.
"Peripherals for Industrial Keyboards & Pointing Devices", Stealth Computer Corporation, downloaded on Dec. 19, 2002, http://www.stealthcomputer.com/peropherals_oem.htm.
"Poly-Optical Fiber Optic Membrane Switch Backlighting", downloaded Dec. 19, 2002, http://www.poly-optical.com/membrane_switches.html.
"Public Safety Technologies Tracer 2000 Computer", downloaded Dec. 19, 2002, http://www.pst911.com/traver.html.
"QuickTime Movie Playback Programming Guide", Apple Computer, Inc., Aug. 11, 2005.
"QuickTime Overview", Apple Computer, Inc., Aug. 11, 2005.
"Rocky Matrix Backlit Keyboard", downloaded Dec. 19, 2002, http://www.amrel.com/asi_matrixkeyboard.html.
"Sony Ericsson to introduce Auto pairing to improve Bluetooth connectivity between headsets and phones", Sep. 28, 2005 Press Release, Sony Ericsson Corporate; downloaded on Apr. 29, 2006 from http://www.sonyericsson.com/spg.jsp?cc=global&lc=en&ver=4001&template=pc3_1_1&z...
"TAOS, Inc., Announces Industry's First Ambient Light Sensor to Convert Light Intensity to Digital Signals", www.taosinc.com/pressrelease_090902.htm, downloaded Jan. 23, 2003.
"Toughbook 28: Powerful, Rugged and Wireless", Panasonic: Toughbook Models, downloaded Dec. 19, 2002, http:www.panasonic.com/computer/notebook/html/01a_s8.htm.
"When it Comes to Selecting a Projection TV, Toshiba Makes Everything Perfectly Clear, Previews of New Releases", www.bestbuy.com/HomeAudioVideo/Specials/ToshibaTVFeatures.asp downloaded Jan. 23, 2003.
"WhyBuy. Think Pad", IBM ThinkPad Web Page Ease of Use, downloaded on Dec. 19, 2002, http://www.pc.ibm.com/us/thinkpad/easeofuse.html.
512MB Waterproof MP3 Player with FM Radio & Built-in Pedometer, Oregon Scientific, downloaded on Jul. 31, 2006 from http://www2.oregonscientific.com/shop/product.asp?cid=4&scis=11&pid=581.
Alex Veiga, "AT&T Wireless Launching Music Service," Yahoo! Finance, Oct. 5, 2004, pp. 1-2.
Apple iPod Technical Specifications, iPod 20GB and 60GB Mac + PC, downloaded from http://www.apple.com/ipod/color/specs.html on Aug. 8, 2005.
Bociurkiw, Michael, "Product Guide: Vanessa Matz,", www.forbes.com/asap/2000/1127/vmartz_print.html, Nov. 27, 2000.

Creative: "Creative Nomad MuVo TX," www.creative.com, Nov. 1, 2004, http://web.archive.org/web/20041024175952/www.creative.com/products/pfriendly.asp?product=9672 [downloaded Jun. 6, 2006].
Creative: "Creative Nomad MuVo," www.creative.com, Nov. 1, 2004, http://web.archive.org/web/20041024075901/www.creative.com/products/product.asp?category=213&subcategory=215&product=110 [downloaded Jun. 7, 2006].
Creative: "MP3 Player," www.creative.com, Nov. 1, 2004, http://web.archive.org/web/20041024074823/www.creative.com/products/product.asp?category=213&subcategory=216&product=4983 [downloaded Jun. 7, 2006].
iAP Sports Lingo 0x09 Protocol V1.00, May 1, 2006.
Written Opinion of the International Searching Authority dated Nov. 24, 2006 in PCT Application No. PCT/US2005/046797.
International Search Report dated Feb. 4, 2003 in corresponding application No. PCT/US2002/033330.
International Search Report dated Jul. 10, 2007 in corresponding application No. PCT/US2006/048738.
International Search Report dated Jul. 2, 2007 in related case PCT/US2006/048669.
International Search Report dated Jun. 19, 2007 in related Application PCT/US2006/048753.
International Search Report dated May 21, 2007 from corresponding PCT Application No. PCT/US2006/048670.
International Search Report in corresponding European Application No. 06256215.2 dated Feb. 20, 2007.
Invitation to Pay Additional Fees and Partial Search Report for corresponding PCT Application No. PCT/US2005/046797 dated Jul. 3, 2006.
Jabra Bluetooth Headset User Manual; GN Netcom A/s, 2005.
Jabra Bluetooth Introduction; GN Netcom A/S, Oct. 2004.
Jabra FreeSpeak BT200 User Manual; Jabra Corporation, 2002.
Kennedy, "Digital Data Storage Using Video Disc," IBM Technical Disclosure Bulletin, vol. 24, No. 2, Jul. 1981.
Nonhoff-Arps, et al., "Straßenmusik Portable MP3-Spieler mit USB-Anschluss," CT Magazin Fuer Computer Technik, Verlag Heinz Heise GMBH, Hannover DE, No. 25, Dec. 4, 2000.
International Search Report dated Nov. 24, 2006 in PCT Application No. PCT/US2005/046797.
Peter Lewis, "Two New Ways to Buy Your Bits," CNN Money, Dec. 31, 2003, pp. 1-4.
Sastry, Ravindra Wadali. "A Need for Speed: A New Speedometer for Runners", submitted to the Department of Electrical Engineering and Computer Science at the Massachusetts Institute of Technology, May 28, 1999.
Sinitsyn, Alexander. "A Synchronization Framework for Personal Mobile Servers," Pervasice Computing and Communications Workshops, 2004. Proceedings of the Second IEEE Annual Conference on, Piscataway, NJ, USA, IEEE, Mar. 14, 2004, pp. 208-212.
Spiller, Karen. "Low-decibel earbuds keep noise at a reasonable level", The Telegraph Online, dated Aug. 13, 2006, http://www.nashuatelegraph.com/apps/pbcs.dll/article?Date=20060813& Cate . . . Downloaded Aug. 16, 2006.
U.S. Appl. No. 11/621,541, "Personalized Podcasting Podmapping" filed Jan. 9, 2007.
Waterproof Music Player with FM Radio and Pedometer User Manual, Oregon Scientific, 2005.
International Search Report dated Apr. 5, 2006 from corresponding International Application No. PCT/US2005/038819.
De Herrera, Chris, "Microsoft ActiveSync 3.1," Version 1.02, Oct. 13, 2000.
IEEE 1394—Wikipedia, 1995, http://www.wikipedia.org/wiki/Firewire.
Miniman, "Applian Software's Replay Radio and Player v1.02," Product review, pocketnow.com, http://www.pocketnow.com/reviews/replay/replay.htm, Jul. 31, 2001.
Personal Jukebox (PJB), "Systems Research Center and PAAD," Compaq Computer Corp., Oct. 13, 2000, http://research.compaq.com/SRC/pjb/.
Compaq, "Personal Jukebox," Jan. 24, 2001, http://research.compaq.com/SRC/pjb/.
Steinberg, "Sonicblue Rio Car," Product Review, Dec. 12, 2000, http://electronics.cnet.com/electronics/0-6342420-1304-4098389.html.
Andrew Birrell, "Personal Jukebox (PJB)," Oct. 13, 2000, http://birrell.org/andrew/talks/pjb-overview.ppt.
Travis Butler, "Portable MP3: The Nomad Jukebox," Jan. 8, 2001, http://db.tidbits.com/getbits.acgi?tbart=06261.
Travis Butler, "Archos Jukebox 6000 Challenges Nomad Jukebox," Aug. 13, 2001, http://db.tidbits.com/getbits.acgi?tbart=06521.
Adam C. Engst, "SoundJam Keeps on Jammin'," Jun. 19, 2000, http://db.tidbits.com/getbits.acgi?tbart=05988.
Musicmatch, "Musicmatch and Xing Technology Introduce Musicmatch Jukebox," May 18, 1998, http://www.musicmatch.com/info/company/press/releases/?year=1998&release=2.
"Nomad Jukebox," User Guide, Creative Technology Ltd., Version 1, Aug. 2000.
"Apple's iPod Available in Stores Tomorrow," Press Release, Apple Computer, Inc., Nov. 9, 2001.
"Apple Introduces iTunes—World's Best and Easiest to Use Jukebox Software," Macworld Expo, San Francisco, Jan. 9, 2001.
iTunes, Playlist Related Help Screens, iTunes v1.0, Apple Computer, Inc., Jan. 2001.
"Apple Announces iTunes 2," Press Release, Apple Computer, Inc., Oct. 23, 2001.
Specification Sheet, iTunes 2, Apple Computer, Inc., Oct. 31, 2001.
iTunes 2, Playlist Related Help Screens, iTunes v2.0, Apple Computer, Inc., Oct. 23, 2001.
SoundJam MP Plus, Representative Screens, published by Casady & Greene, Inc., Salinas, CA, 2000.
"SoundJam MP Plus Manual, version 2.0"—MP3 Player and Encoder for Macintosh by Jeffrey Robbin, Bill Kincaid and Dave Heller, manual by Tom Negrino, published by Casady & Greene, Inc., 2000.
"Digital Still Cameras—Downloading Images to a Computer," Mimi Chakarova et al., Multi-Media Reporting and Convergence, 2 pgs.
Office Action dated Sep. 3, 2009 in U.S. Appl. No. 11/324,863.
Office Action dated Jan. 26, 2009 in U.S. Appl. No. 11/373,468.
Office Action dated Jun. 24, 2009 in U.S. Appl. No. 11/373,468.
Kadir et al., "Adaptive Fast Playback-Based Video Skimming Using a Compressed-Domain Visual Complexity Measure", 2004 IEEE International Conference on Multimedia and Expo, pp. 2055-2058.
Office Action dated Oct. 16, 2008 in U.S. Appl. No. 11/327,544.
Office Action in European Patent Application No. 05 855 368.6 dated Nov. 20, 2008.
Office Action dated Dec. 15, 2008 in U.S. Appl. No. 11/212,313.
Notice of Allowance dated Dec. 18, 2008 in U.S. Appl. No. 11/212,555.
International Search Report dated Oct. 10, 2008 in PCT Application No. PCT/US2007/077160.
Written Opinion dated Oct. 10, 2008 in PCT Application No. PCT/US2007/077160.
Office Action dated Sep. 1, 2008 in EP Application No. 06 256 215.2.
Written Opinion dated Jan. 6, 2009 in Singapore Application No. 2007018658.
Office Action dated May 27, 2009 in U.S. Appl. No. 11/439,613.
Office Action dated Jun. 2, 2009 in U.S. Appl. No. 11/530,773.
Office Action dated May 11, 2009 in U.S. Appl. No. 11/680,580.
Notice of Allowance dated Apr. 21, 2009 in U.S. Appl. No. 11/327,544.
Office Action dated Mar. 30, 2009 in U.S. Appl. No. 11/515,270.
Office Action dated Apr. 9, 2009 in U.S. Appl. No. 11/583,199.
Notice of Allowance dated Jun. 15, 2009 in U.S. Appl. No. 11/212,313.
Office Action dated Jun. 22, 2009 in U.S. Appl. No. 11/515,270.
Office Action dated Jun. 24, 2009 in U.S. Appl. No. 11/519,352.
Office Action dated Sep. 10, 2009 in U.S. Appl. No. 11/746,548.
Office Action dated Sep. 2, 2009 in U.S. Appl. No. 11/515,270.
Office Action dated Oct. 16, 2009 in U.S. Appl. No. 11/583,199.
Office Action dated Oct. 23, 2009 in Chinese Application No. 200580048143.9.
Office Action dated Nov. 16, 2009 in U.S. Appl. No. 11/439,613.
Office Action dated Nov. 16, 2009 in U.S. Appl. No. 11/144,541.

Office Action dated May 29, 2009 in EP Application No. 06 847 856.9.
Office Action dated Dec. 11, 2009 in U.S. Appl. No. 11/519,352.
Office Action dated Dec. 16, 2009 in U.S. Appl. No. 11/746,548.

Examination Report dated Sep. 1, 2009 in Singapore Application No. 200701865-8.

* cited by examiner

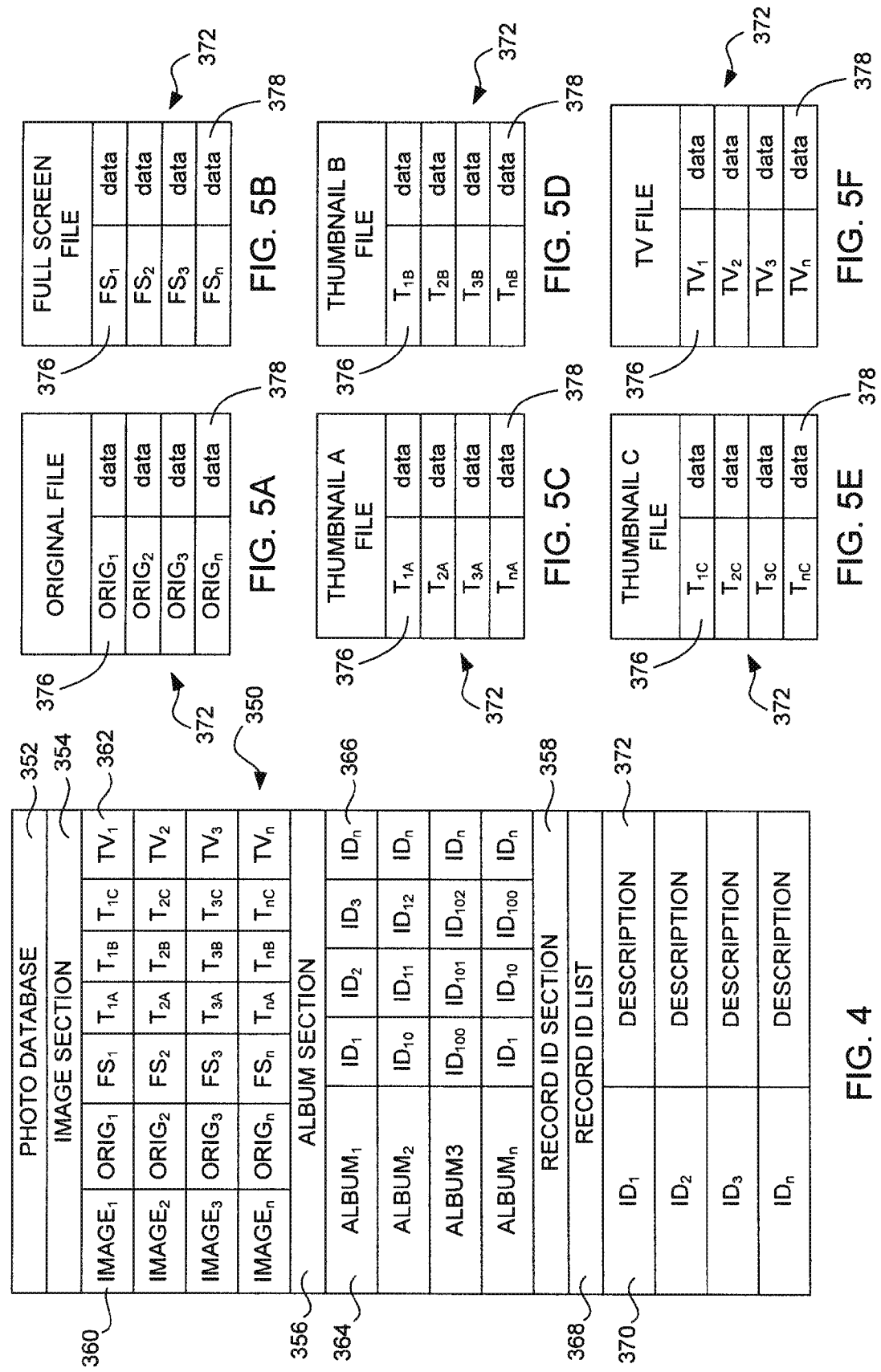

Image data not transformed by host / Image display by media player

Image data transformed by host / Image display by media player

HOST CONFIGURED FOR INTEROPERATION WITH COUPLED PORTABLE MEDIA PLAYER DEVICE

CROSS-REFERENCE TO RELATED APPLICATIONS

This application also claims priority under 35 U.S.C. §119 (e) to U.S. Provisional Application No. 60/728,812, filed Oct. 19, 2005, and entitled HOST CONFIGURED FOR INTEROPERATION WITH COUPLED PORTABLE MEDIA PLAYER DEVICE, which is hereby incorporated herein by reference.

This application is a continuation in part of U.S. application Ser. No. 10/973,657, filed Oct. 25, 2004, entitled IMAGE SCALING ARRANGEMENT, now U.S. Pat. No. 7,433,546 issued Oct. 7, 2008, which is hereby incorporated by reference. This application is related to: (i) U.S. application Ser. No. 10/973,925, filed Oct. 25, 2004, and entitled MULTIPLE MEDIA TYPE SYNCHRONIZATION BETWEEN HOST COMPUTER AND MEDIA DEVICE, which is hereby incorporated herein by reference; (ii) U.S. application Ser. No. 10/987,649, filed Nov. 12, 2004, and entitled WIRELESS SYNCHRONIZATION BETWEEN MEDIA PLAYER AND HOST DEVICE, which is hereby incorporated herein by reference; (iii) U.S. application Ser. No. 10/277,418, filed Oct. 21, 2002, and entitled INTELLIGENT INTERACTION BETWEEN MEDIA PLAYER AND HOST COMPUTER, which is hereby incorporated herein by reference; and (iv) U.S. application Ser. No. 10/118,069, filed Apr. 5, 2002, and entitled INTELLIGENT SYNCHRONIZATION OF MEDIA PLAYER WITH HOST COMPUTER, which is hereby incorporated herein by reference.

BACKGROUND OF THE INVENTION

1. Field of the Invention

The present invention relates to portable media devices and more particularly to interoperation of a portable media device with a host apparatus.

2. Description of the Related Art

The hand-held consumer electronics market is exploding, and an increasing number of these products including for example PDAs, music players, cellular phones, cameras, and video games have increased their functionality to distance themselves from their competitors. By way of example, cellular phones have added PDA and camera functionality, PDAs have added cellular phone and music player functionality, music players have added PDA and video game functionality, etc. In the future, it is foreseeable that the functionality of all these devices will continue to merge into a single device. As these products evolve, it is believed that many design challenges will be encountered.

Many hand-held computing devices work hand in hand with a personal computer. The personal computer typically serves as a base to the portable hand-held computer device. For example, because they are hand-held, they are typically a portable extension of the personal computer. Like personal computers, these highly portable devices typically include a processor that operates to execute computer code and produce and use data in conjunction with an operating system. Unlike personal computers, however, these devices typically use less complex operating systems as well as smaller and less expensive processors that are slower than the processors used in personal computers. While this may be appropriate when the devices operate normally, difficulties arise when these hand-held computing devices are called upon to perform process intensive tasks. The difficulties include slow responsiveness and high power consumption. As a result, the user may be left with a negative user experience, i.e., users may not like a product that is slow and whose battery life is short.

Personal computers typically include software that helps manage the handheld computing devices. The personal computer may include for example a photo management program that helps transfer photos from the camera to the personal computer. The photo management program may also allow a user to sort, store and catalog their images as well as to provide touch-up capabilities such as red eye reduction, black and white conversion, image cropping and rotation. In some cases, the cameras modify the original image by embedding or storing thumbnail images inside the original image. The photo management program uses the embedded thumbnail images when importing the original image. For example, as each photo is being imported, the photo management program may show the thumbnail image thereby relaying to the user that the image is being imported.

In addition to photo management programs, the personal computer may also include music management programs that help transfer music from the personal computer to a music player such as an MP3 music player. Like the photo management program their music, the music management program may also allow a user to sort, modify, store and catalog their music. More particularly, the music program may give the user the ability to organize their music into playlists, edit file information, record music, download files to a music player, purchase music over the Internet (World Wide Web), run a visualizer to display the music in a visual form, and encode or transcode music into different audio formats such as MP3, AIFF, WAV, AAC, and ALE. Typically, music players only understand a single music format. Therefore, the music management program typically can to transcode the music stored in the personal computer from one music format to the desired music format of a music player.

In some cases, both the photo and music programs are linked so that the images and music stored therein can be played together. For example, the photo management program may allow a user to produce slide shows that show images to music. By way of example, the photo management program may correspond to iPhoto® and the music management program may correspond to iTunes®, both of which are manufactured by and available from Apple Computer Inc. of Cupertino, Calif.

Synchronization operations have been conventionally performed between portable devices, such as Personal Digital Assistants (PDAs) and host computers, to synchronize electronic files or other resources. For example, these files or other resources can pertain to text files, data files, calendar appointments, emails, to-do lists, electronic rolodexes, etc.

In the case of media players, such as MP3 players, files are typically moved between a host computer and a media player through use of a drag and drop operation, like is conventionally done with respect to copying of a data file from a Windows desktop to a floppy disk. Hence, the user of the media player can manually initiates synchronization for individual media items. As a consequence, synchronization tends to be tedious and time consuming for users. More recently, media players have been able to be synchronized with a host computer when a bus connection over a cable is made. Here, the synchronization can be automatically initiated when the cable is connected between the host computer and the media player. The iPod® offered by Apple Computer, Inc. of Cupertino, Calif. has the capability to provide such synchronization over a cable.

Thus, there is a continuing need for improved features for connecting and transferring data between media devices and their hosts. In particular, it is desirable to configure the inter-operation of a host device and an attached media device, in view of capabilities of the attached media device. This is particularly so where there is ubiquitous use of host software and media devices having varying capabilities.

SUMMARY OF THE INVENTION

The invention relates, in one embodiment, to a method of transferring image data between a host device and a portable media device capable of storing and presenting media items, namely, images. The method includes designating, at the host device, at least one image for downloading to the portable media device. The method also includes producing an image collection for each requested image at the host device. Each image collection contains new versions of the requested image. Each new version can have a different image profile based on the capabilities of the portable media device. The method further includes sending at least the image collection including each version of the requested image to the portable media device. In some cases, the requested image is also sent with the various versions thereof.

The invention relates, in another embodiment, to an operational method for a portable media device. The method includes storing image data. The image data includes a plurality of image collections. Each image collection contains a plurality of differently formatted images based on the same original image. The image collections are separately generated on a device other than the portable media device. In some cases, the original image is stored along with the differently formatted images. The method also includes receiving a display command. The display command designates one or more images of the image data to be displayed. The method further includes retrieving at least the designated images. The method additionally includes outputting one or more of the retrieved images.

The invention relates, in another embodiment, to a method of transferring image data between a host device and a portable media device capable of storing and playing media items. The method includes receiving an image download request. The image download request designates one or more images for downloading from the host device to the portable media device. The method also includes creating a database entry for each of the images to be downloaded. The method further includes copying the database entry on at least the portable media device. The method additionally includes creating an image collection for each requested image at the host. The image collection includes the original image and differently formatted images based on the original image. Moreover, the method includes copying the image collection to the portable media player and updating the database entry with information about each of the images in the image collection.

The invention relates, in another embodiment, to a portable media device capable of viewing images. The device includes a storage device containing downloaded image data. The downloaded image data includes a plurality of image collections. Each image collection includes a plurality of different versions of the original image. In some cases, the downloaded image data also includes the original image. The device also includes a processor configured to supply at least a portion of the image data to a display.

The invention relates, in another embodiment, to a computer readable medium including at least computer program code for managing images. The computer readable medium including capabilities for storing a plurality of image collections where each image collection includes a plurality of different versions of the original image and in some instances the original image as well. The computer readable medium also including capabilities for retrieving one or images from storage when a display command is generated and presenting one or more of the retrieved images.

The invention relates, in another embodiment, to a download embodied as a carrier wave in a media communication system that facilitates communications between a host device and a portable media device. The download includes image data including a plurality of image collections. Each image collection includes an a plurality of different versions of an original image, and in some cases the original image as well.

The invention relates, in another embodiment, to a media management method. The method includes loading one or more images to a personal computer and storing the one or more images on the personal computer. The method also includes connecting a hand held media device to the personal computer. The method further includes presenting images or image identifiers on personal computer and generating a download command designating one or more images to be downloaded from the personal computer to the hand held media device. The method additionally includes determining the image formats required by the hand held media device, creating new versions of the designated images and copying and storing at least the new versions of the designated images on the hand held media device. Moreover, the method includes disconnecting the hand held media device from the personal computer. Additionally, the method includes generating a display command on the hand held media device, retrieving one or more images from storage based on the display command, and presenting one or more of the retrieved images.

BRIEF DESCRIPTION OF THE DRAWINGS

The invention will be readily understood by the following detailed description in conjunction with the accompanying drawings, wherein like reference numerals designate like structural elements, and in which:

FIG. 4 is an exemplary diagram of a photo database file, in accordance with one embodiment of the present invention.

FIGS. 5A-5F are diagrams of image set files, in accordance with several embodiments of the present invention.

DETAILED DESCRIPTION OF THE INVENTION

Figure 1:
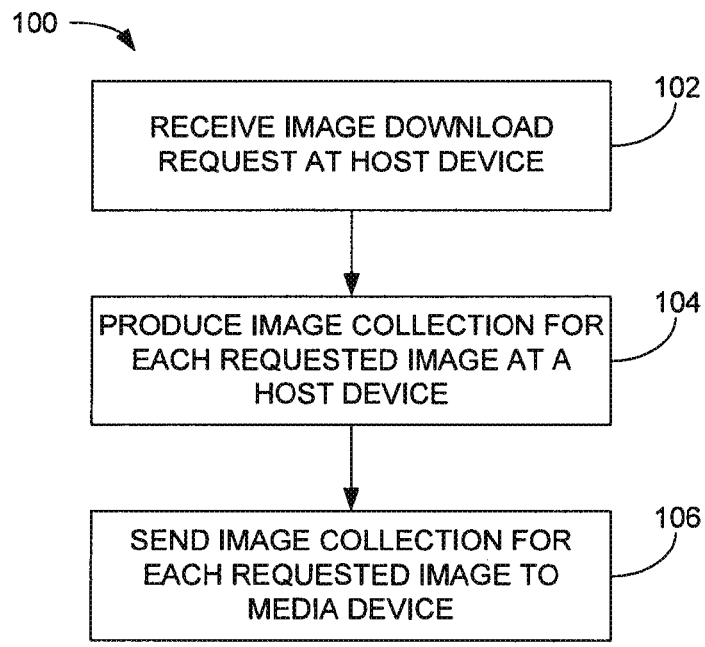
FIG. 1 is a method of transferring image data between a host device and a portable media device, in accordance with one embodiment of the present invention.

The present invention relates to portable media devices with image functionality and also to image transfer between portable media devices and their hosts. Media devices with image functionality typically require several different image formats to support the various display modes of the media device. For example, media devices typically require a full screen image that fills the entire display screen of the media device as well as various thumbnail images, which may help a user browse through a group of images.

One method for creating these various images is to download the original image to the portable media device and then to transcode the original image into the required formats on the portable media device when they need to be displayed. This is sometimes referred to as processing data on-the-fly. While this may work, it is generally believed that this methodology has several drawbacks that make it less appealing to the user. For example, because formatting images is a process intensive task (especially on portable media devices that lack the horsepower of their larger hosts), portable media devices tend to operate slowly and consume more power. Hence, formatting images on portable media devices tend to result in an unsatisfactory user experience. For one, the user has to wait while the image is being formatted. For another, the battery of the portable media device tends to run out more regularly.

In order to overcome these drawbacks, the present invention provides a method where images are preformatted on the host before or during the download thereto. When an image is identified for download various preformatted images derived from the original image (and possibly the original images) are sent to the portable media device. The processing is performed on the host, which can handle these tasks more easily than the portable media player. The tasks may, for example, include scaling, cropping, rotation, color correction and the like. Once received by the portable media device, the preformatted images and possibly the original image are stored for later use. By storing these images, the media device is relieved from having to perform any of the labor intensive tasks associated with image formatting. That is, the preformatted images relieve the media device of much of the work required to display them. As a result, the device operates faster and without repeated needs for recharging. In one embodiment, at least some of the preformatted images are thumbnail images.

During media device use, a user may request that an image be displayed. Instead of processing the original image as in the method described above, the device simply obtains the appropriate preformatted image from storage and presents it to the user on a display. The preformatted images may include a full screen image and several different thumbnail sized images. The full screen image typically depends on the size of the display contained in the portable media device, i.e., the full screen image generally fills the entire screen. The different sized thumbnail images, which come in various sizes, may be used in a variety of ways including separately or together. For example, a plurality of smaller thumbnails may be grouped together so that a user can quickly browse through a large number of images. The preformatted images may also follow formats associated with standards or other devices to which the portable media device can be linked. For example, at least one the preformatted images may be based on television formats so that the portable media device can present images on televisions (TVs). The TV formats may, for example, include NTSC, PAL, HDTV, and the like. The formats may also be based on formats associated with printers, cameras or similar image using devices.

In some cases, the media device when connected to a host expresses or informs the host as to which image formats are desired when an image is downloaded to the media device. The media device may, for example, send various image profiles corresponding to the different formats to the host device. The image profile generally contains the attributes or keys for each image format. By way of example, the image profiles may describe size, orientation, pixel format, color depth, etc. for each image format. This particular methodology helps with compatibility issues that typically come up when different media devices having different versions of software and hardware are used, i.e., the version of the software/hardware is made irrelevant since the media device expresses what information it wants from the host device.

Embodiments of the invention are discussed below with reference to FIGS. 1-11F. However, those skilled in the art will readily appreciate that the detailed description given herein with respect to these figures is for explanatory purposes as the invention extends beyond these limited embodiments.

FIG. 1 is a method 100 of transferring image data between a host device and a portable media device, in accordance with one embodiment of the present invention. The method 100 may, for example, be performed by media management software. The method includes blocks 102, 104 and 106. In block 102, an image download request is received at the host device. The image download request designates at least one image stored on the host device for downloading to the portable media device. In some cases, only a single image is requested and in other cases a plurality of images are requested. The request can be made at the host device or the media device through a user interface. For example, the user may select a group of images and then select a download button. Alternatively, the request can be made by the media device without user input.

In block 104, an image collection for each requested image is produced at the host device. Each image collection contains the new versions or different formats of the original image. In some cases, the image collection may also contain the original image. For example, the new versions may include a full screen image, which corresponds to the screen size on the media player, various thumbnail images, each of which are typically smaller versions of the original image, as well as various other images including for example TV images. It should be noted that the file sizes of the new versions are typically much smaller than the file size of the original image. They therefore take up less space in storage than would the corresponding original image.

Each new version has a different image profile based on the display needs of the portable media device. The image profiles for particular media devices may be stored in the host device or the image profiles may be given to the host device by the media device. In the first case, the media device may provide the host device with an Identifier (ID), which can be used by the host to determine the image profiles for the requesting media device. For example, after obtaining the ID the host may refer to a previously stored table or list that includes all the capabilities of the identified media device. In the later case, the media device may automatically upload this information as part of synchronization or handshaking procedure with the host device.

The image profile generally includes a list of keys or attributes which define the qualities or characteristics of each image. The keys or attributes may include for example FormatID, RenderWidth, RenderHeight, DisplayWidth, DisplayHeight, PixelFormat, Sizing, BackColor, Rotation, ScanFormat, ColorAdjustment, GammaAdjustment, and the like.

FormatID refers to an identification number that defines the image profile. Changing any of the attributes within the image profile will change the identification number. The media management program uses this ID to identify thumbnail locations in both the host and media devices.

RenderWidth is the width of the image in pixels at render time. RenderHeight is the height of the image in pixels at render time. RenderWidth and RenderHeight generally refers to actual physical size.

DisplayWidth is the width of the image in pixels at display time. DisplayHeight is the height of the image in pixels at display time. It should be noted that DisplayHeight and DisplayWidth can differ from RenderHeight and RenderWidth in those cases like NTSC where the pixels are not square. DisplayWidth and DisplayHeight generally refer to the true size.

PixelFormat describes information encoded in each pixel (e.g., color components (RGB), transparency, etc.). Several formats can be used including, for example, the QuickDraw/QuickTime pixel format.

Sizing describes what happens if the original image is smaller than the desired thumbnail. By way of example, if 0, scale the image to the desired height/width. If 1, scale the image to the desired height/width only if the image is larger than RenderWidth or RenderHeight, i.e., don't scale small images. If 2, center-crop the image to the desired height/width rather than scaling it.

BackColor describes what color the background should be in cases where the images don't fill the entire viewing area. The background color may be in big-endian ARGB format as a hexadecimal string.

Rotation described if and how an image should be rotated. The image rotation is typically in degrees. For example, the rotation values may be 0, 90, 180 and 270.

ScanFormat designates what scan format the image is stored in. ImageFormat may include progressive format or interlace format.

ColorAdjustment describes whether or not a color adjustment is needed, and if needed what the color adjustment should be. By way of example, if 0, no color adjustment is applied. If 1, NTSC color adjustment is applied. If 2, PAL color adjustment is applied.

GammaAdjustment describes whether a gamma correction needs to be applied to the image (e.g., brightness). If not supplied, no correction is done.

In block 106, the image collection for each requested image is sent to the portable media device as part of the downloading process. Once received by the portable media device, the image collection is stored in the portable media device for later use. The image collection may be stored in the memory of the portable media device. In order to efficiently store the images in memory, each of the different image sets may be stored in their own file. That is, images having the same image profile are grouped in the same file. For example, the original images may be stored in a first file, the full screen images may be stored in a second file, a first set of thumbnail images may be stored in a third file, a second set of thumbnail images may be stored in a fourth file, the TV images may be stored in a fifth file and so on.

It should be noted that in some cases, the original image may not be sent to or stored on the hand held media device. This may be done to save valuable storage space on the hand held media devices that typically have limited storage capacity. As should be appreciated, the file size of the original image is typically much larger than the thumbnail images and therefore they can take up more space in memory. The decision of whether to include the original image with the rest of the images may be made by the user. For example, the user may be presented with a choice as whether they desire or do not desire to download or store the original image. This decision may be based on how the user uses the media device. For some, the media device may be used to transfer images from one host to another. In cases such as these, the user typically wants to include the original image. The decision may be set for all downloads or it may be made at each down load request. Similarly, the same decision can be made for all the different formats if so desired (as some of these formats may not be needed).

Once downloaded and during operation of the media device, a display request may be made on the media device. Thereafter, one or more images are retrieved from memory based on the display request. The display request indicates the images to be shown on the media player and/or images that are to be sent to another device connected to the media device. Once retrieved, the images can be displayed. The manner in which the images are displayed are typically determined by the mode of the media device. The modes can include a browse mode, a slide show mode, a full screen mode, etc. In browse mode, a plurality of tiny thumbnail images are displayed in rows and columns. In a slide show mode, a medium thumbnail image may be displayed in the center and smaller thumbnail images may be displayed on either side of the medium thumbnail image. The small image to the left of the medium image may represent a previously shown image, the medium image may represent the current image being shown, and the small image to the left of the medium image may represent the next image in the slide show sequence. If a TV is connected to the media device, the media device may output the TV version of the current image being shown to the TV. In a full screen mode, the full screen image is displayed.

Figure 2:
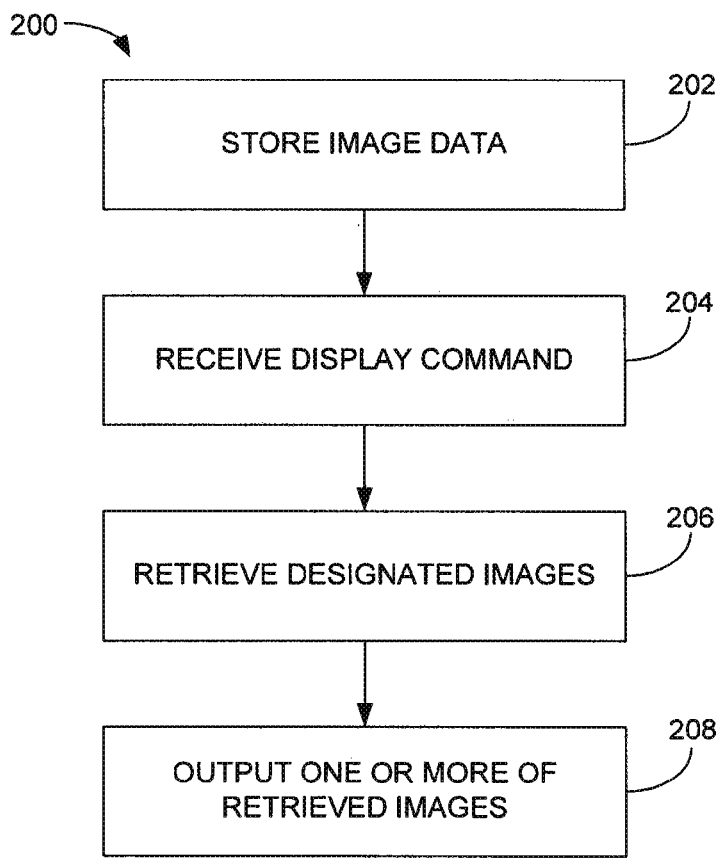
FIG. 2 is an operational method for a portable media device, in accordance with one embodiment of the present invention.

FIG. 2 is an operational method for a portable media device 200, in accordance with one embodiment of the present invention. The method includes blocks 202, 204, 206 and 208. In block 202, image data is stored. The image data includes at least a plurality of image collections. The image collections contain a plurality of differently formatted images based on an original image and may also include the original image. The image collections are not formed on the portable media device. They are separately generated on a device other than the portable media device. The image collections may for example be generated on a host device that downloads them to the portable media device for storage. By way of example, the image collections may be provided by the method described in FIG. 1. Alternatively or additionally, the image collections may be downloaded from another portable media device that has already downloaded them from a host.

In block 204, a display command is received. The display command designates one or more images of the image data to be displayed. The display command may be generated via a user making a selection on the user interface of the media player.

In block 206, at least the designated images are retrieved. In some cases, only the designated images are retrieved. In other case, more than the designated images are retrieved. For example, although the display command may only designate a single image, other images associated or linked to that image may be additionally retrieved.

In block 208, the one or more retrieved images are outputted. The retrieved images may be outputted to a display. The display may be located on the portable media device or it may be located external to the portable media device. In either case, upon receiving the retrieved images, the retrieved images are displayed. IN some cases, all of the images are displayed, and in other case only a portion of the images are displayed. The later case may be implemented when the size and number of images is greater than the screen size.

Figure 3:
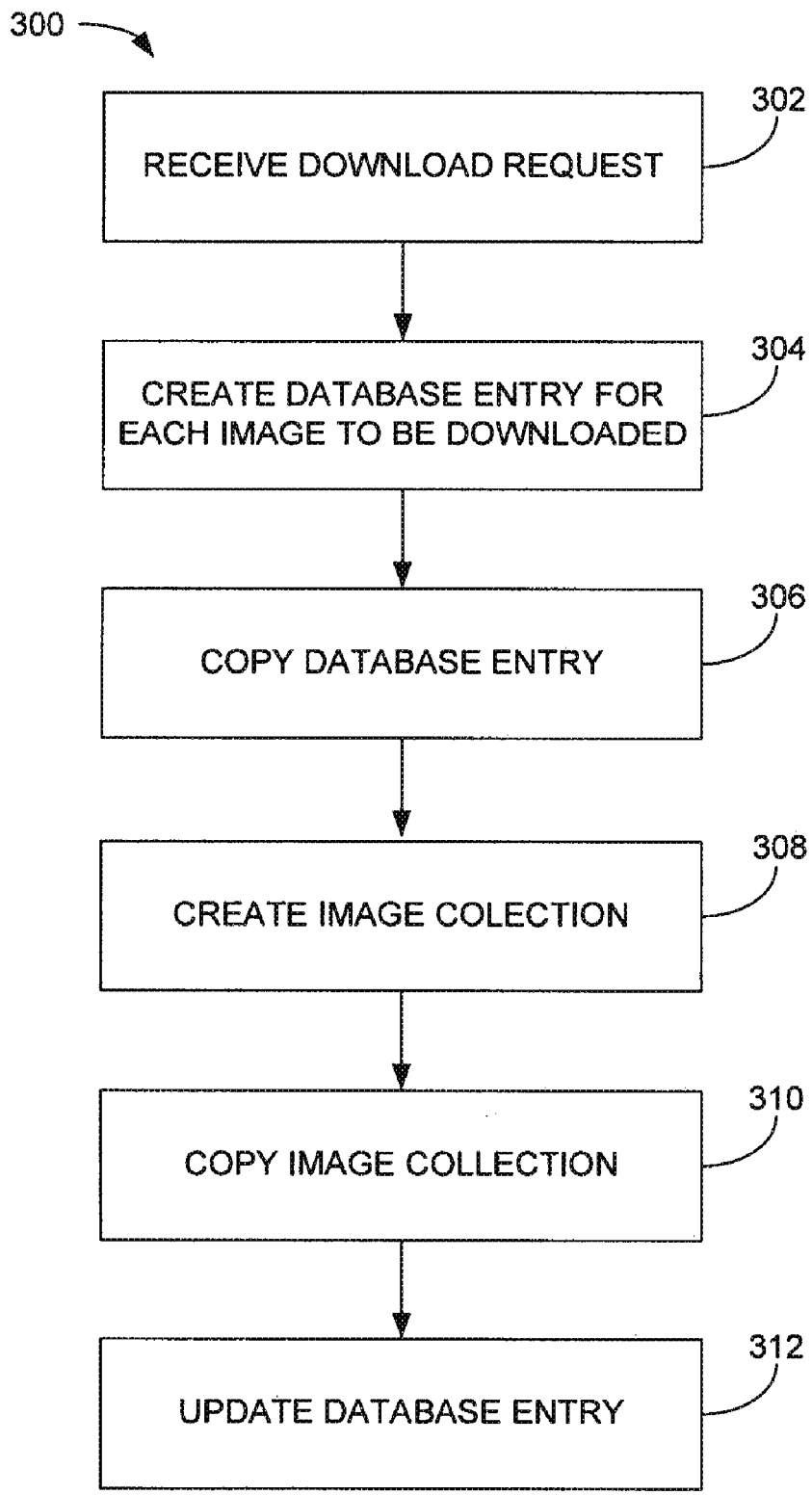
FIG. 3 is a method of transferring image data between a host device and a portable media device, in accordance with one embodiment of the present invention.

FIG. 3 is a method 300 of transferring image data between a host device and a portable media device, in accordance with one embodiment of the present invention. The method may for example be performed by a media management program operating on the host device. The method begins at block 302 where a down load request is received. The download request designates one or more images to be downloaded from the host device to the portable media device. The download request is typically implemented via a user selection, i.e., a user selects one or more images and initiates a downloading procedure.

Following block 302, the method proceeds to block 304 where a database entry is created for each image to be downloaded. The database entry provides information about the images to be downloaded. The information may for example be metadata. Following block 304, the method proceeds to block 306 where the database entry is written or copied on the media device. The database entry is typically copied to an image database on the media device. If an image database does not exist, one will typically be created. If one does exist, the database entry will be copied thereto.

Also following block 304, the method proceeds to block 308 where an image collection is created on the host. This may include transcoding new versions of the selected image based on a plurality of image profiles, and grouping the new versions of the original image and in some cases the original image into an image collection. The image profiles define the features of the new images. By way of example, the image profiles may include keys for making thumbnails and other images such as those which can be used on TV, printers, and other media devices (e.g., camera). The image profiles may be supplied to the host device by the media device, and thereafter stored locally on the host device. This may be part of the synchronization procedure that occurs between the host device and media device when they are connected together.

Following block 308, the method proceeds to block 310 where each image in the image collection is written or copied to the media device. That is, each new version of the original image and in some cases the original image are copied to the media device. In one embodiment, each particular type of image is stored in a separate file on the media device. For example, all of the originals are stored in an original image file, all of a first thumbnails are stored in a first thumbnail image file, and so on.

Following block 310, the method proceeds to block 312 where the database entry is updated. That is, the database entry is filled with the appropriate image data. The step of updating typically includes grouping together all the images of a particular image collection (original, thumbnails, TV), and providing pointers to the location where the actual image is stored (e.g., image files).

It should be noted that in most cases the host device stores a copy of the database entry and image collections in parallel with the media device.

It should be noted that the all or some of the steps mentioned above can occur separately as distinct events or they can occur simultaneously. In the later case, at least some of the steps can be interleaved. In interleaving, while some images are being copied, other images are being created. Interleaving is generally preferred in order to reduce the amount of time needed for downloading.

The image data stored in the media device will now be described. As mentioned above the image data is spread among multiple files. The main image database file holds image metadata, photo album lists, and "pointers" to the original image as well as all available thumbnails. The images themselves are stored either as individual files (originals) or in image set files, which contain one or more thumbnails of the same type. This is typically done to save storage space. It should be noted, however, that this is not a limitation and that the images may be stored as an image collection rather than in separate files.

In one embodiment, the photo database file contains a header followed by several "sections." The number of sections can be widely varied although it is expected that the photo database will contain three sections: image list section, album list section and the image record ID table. The image list section contains a list of all images stored on the media device. Each image entry contains all of the metadata for an image as well as a list of locations for all available images associated therewith including the original, thumbnails and TV. Each image has a unique persistent record ID which is used in both the album and record ID table sections. The album list section contains a list of the albums, each of which is simply an ordered list of image record IDs. The image record ID table is a table containing record IDs and file offsets for all images, sorted in ascending record ID order. This table allows the media device to quickly load only those image records for a given album, rather than requiring loading the whole image record list.

The images themselves are stored in image set files. Each image set file contains a file header, followed by one or more images, each with a header. This allows scavenging of the data should the need arise. The image records in the photo database are by file specification (path) and file offset, so it is not necessary to parse an image set file to get to a particular image. The number of images per file and/or the maximum image files size may be widely varied. By way of example, the maximum size may be 500 Megabytes.

The following is an exemplary layout for the photo database stored on the media device:

```
File header
    Image List Section Header
        Image List header
            Image 1 metadata
                Image 1 Original Image Location
                Image 1 Thumbnail 1 Image location
                <additional image locations>
            Image 2 Metadata
                Image 2 Original Image Location
                Image 2 Thumbnail 1 Image location
                <additional image locations>
            <additional images>
```

-continued

```
Album List Section Header
    Album 1 Metadata
        Album 1 Image Record ID 1
        Album 1 Image Record ID 2
        <additional album images>
    Album 1 Metadata
        Album 1 Image Record ID 1
        Album 1 Image Record ID 2
        <additional album images>
    <additional albums>
Record ID List Section Header
Record ID List Header
    Record ID 1 Description
    Record ID 2 Description
    <additional record Ids>
```

The following is an exemplary layout for an image set file stored on the media device:

```
File Header
    Image 1 Header
        Image 1 Data
    Image 2 Header
        Image 2 Data
    <additional images>
```

FIG. 4 is an exemplary diagram of a photo database file 350, in accordance with one embodiment of the present invention. The photo database 350 includes a file header 352, an image list section header 354, an album list section header 356 and a record ID list section header 358. Inside the images list section header 354 are image entries 360, and pointers 362, which provide image locations for the various images in the image entry including for example the original image O and a plurality of thumbnails T thereof. Inside the album list section header 356 are album entries 364 and record IDs 366 for each of the images in the album. Inside the record ID list section header 358 are Record ID list header 368 and record ID descriptions 370.

FIGS. 5A-5E are diagrams of exemplary image set files 372, in accordance with one embodiment of the present invention. FIG. 5A is a diagram of an original image set file 372A, FIG. 5B is a diagram of a tiny thumbnail set file 372B, FIG. 5C is a diagram of a small thumbnail set file 372C, FIG. 5D is a diagram of a medium thumbnail set file 372D, FIG. 5E is a diagram of a full screen image set file 372E, and FIG. 5F is a diagram of a TV screen image set file 372F. In each of these figures, the image set files 372 include a file header 374, image headers 376 and the actual image data 378.

Figure 6:
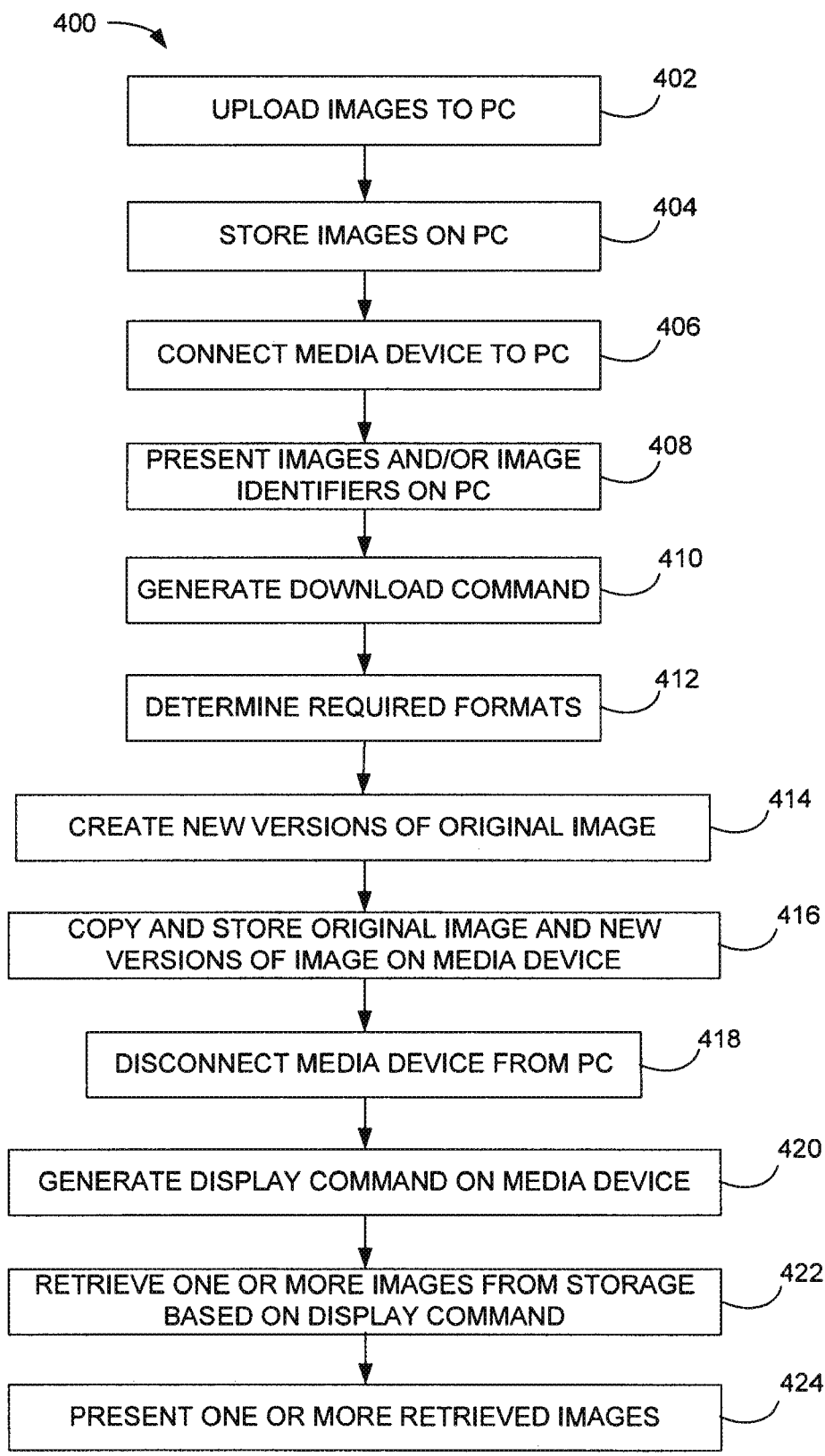
FIG. 6 is media method, in accordance with one embodiment of the present invention.

FIG. 6 is media method 400, in accordance with one embodiment of the present invention. The method may be performed on a media system including a host device such as a personal computer and a media device. The method begins at block 402 where one or more images are uploaded into a personal computer. The images may be uploaded from a camera, memory device, Internet or the like. After block 402, the method proceeds to block 404 where the images are stored in the personal computer. Blocks 402 and 404 may be accomplished with a media management program. In Block 406, a media player is connected to the personal computer. This may be accomplished through a wired or wireless connection. The connection may include a handshaking and/or synching procedure.

In some cases, the media management program is automatically opened when the two devices are connected. The particular media management program opened may depend on the type of media device. If the media device is a music player, the media management program may be a music program. If the media device is a photo player, the media management program may be an image program. If the media device is a combination music/photo player, the media management program may be music program or a photo program or a combination of the two. If the different programs are operated independently, the music program and the photo program may be linked so that information can be shared there between. For example, the music program may be able to access data from the photo program and vice versa.

In block 408, images and/or image identifiers (e.g., text) are presented on the personal computer. This too may be accomplished with the media management program. In fact, the images and image identifiers may be included in a photo window associated with a graphical user interface. In block 410, a download command is generated. The download command designates one or more images to be downloaded from the personal computer to the portable media device. The download command may be generated when a user selects one or more images and hits a download feature located in the photo window.

In block 412, the image formats required by the portable media device are determined. The determination may be made before the download or it may be made as part of the downloading process. In some cases, the host device stores a list of required formats for a variety of media devices. In other cases, the portable media device supplies the personal computer with required formats and image profiles, which describe how to format each image. In block 414, new versions of the original image are created. That is, using the image profiles, the personal computer transcodes the original image into differently formatted images based on the image profile. By way of example, the transcoding may be performed by a multimedia technology such as QuickTime of Apple Computers Inc. of Cupertino, Calif. QuickTime is a powerful, cross platform, multimedia technology for manipulating, enhancing, and storing video, sound, animation, graphics, text, music, and the like. In Block 416, the new versions of the original image and in some cases the original image are copied and stored onto the media device.

In block 418, the media device is disconnected from the personal computer thereby allowing the images to be transported via the portable media device. In block 420, a display command is generated on the media device during transport. In block 422, one or more images are retrieved based on the display command. In block 424, at least one of the retrieved images is presented. The retrieved image can be any of the stored images including the original and/or the new images. The retrieved image can be presented on the portable media device as for example though an LCD and/or it can be presented on an external display such as a television.

At least some of the description above (for example, with reference to FIG. 3) has been in the context of image collections created on the host for transfer to the media device. Images need not be provided from the host device to a media player as part of an image collection. In one example, an image display on the media player (e.g., the display 714 of the media player 700 shown in FIG. 9) is physically oriented in the media player such that, for images provided for display on the image display, the images are rotated. It can be seen that inherent rotation of images is due to an inherent property of the media player.

In accordance with one example, for a media player known by the host to have such an image display, the host device preprocesses images in a manner complementary to the inherent image rotation by the media player, before transferring the images to the media player. As discussed above, by the host performing such preprocessing, the media device is relived from having to perform the labor-intensive tasks associated with image formatting to compensate for the inherent image rotation by the media player.

Figure 14:
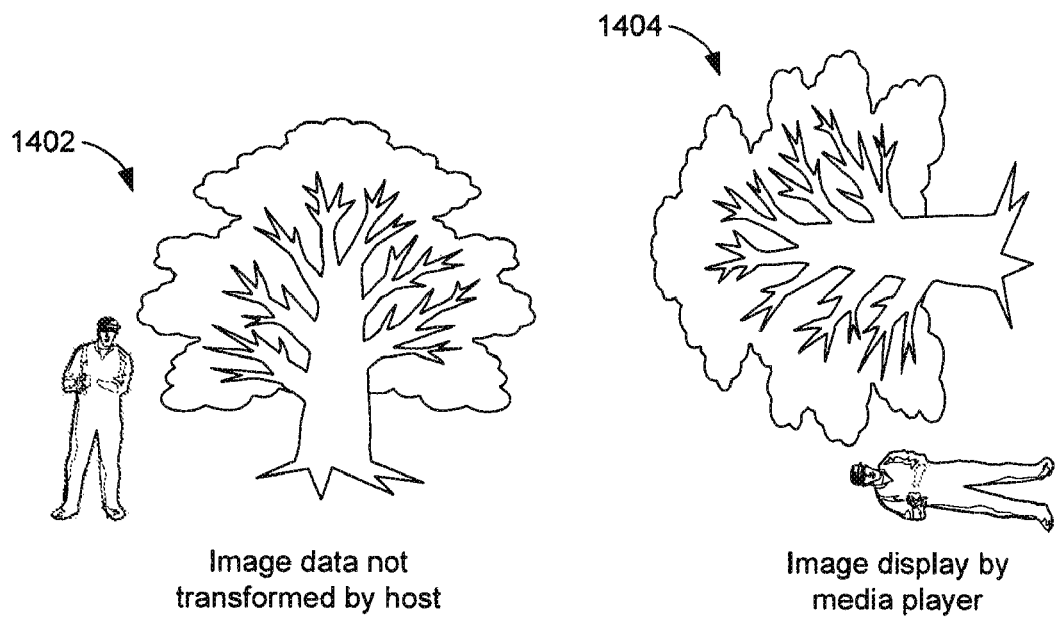
FIG. 14 illustrates an example of an image provided by the host and how the image is transformed by the portable media player upon playback.

For example, referring to FIG. 14, image data not preprocessed (i.e., in this case, not transformed) is denoted by reference numeral 1402. Reference numeral 1404 indicates an image display 1404, using the media player described in the previous paragraph. It can be seen that the image in the image display 1404 (including the person and the tree) is rotated counterclockwise by ninety degrees from the image represented by the untransformed image data.

Figure 15:
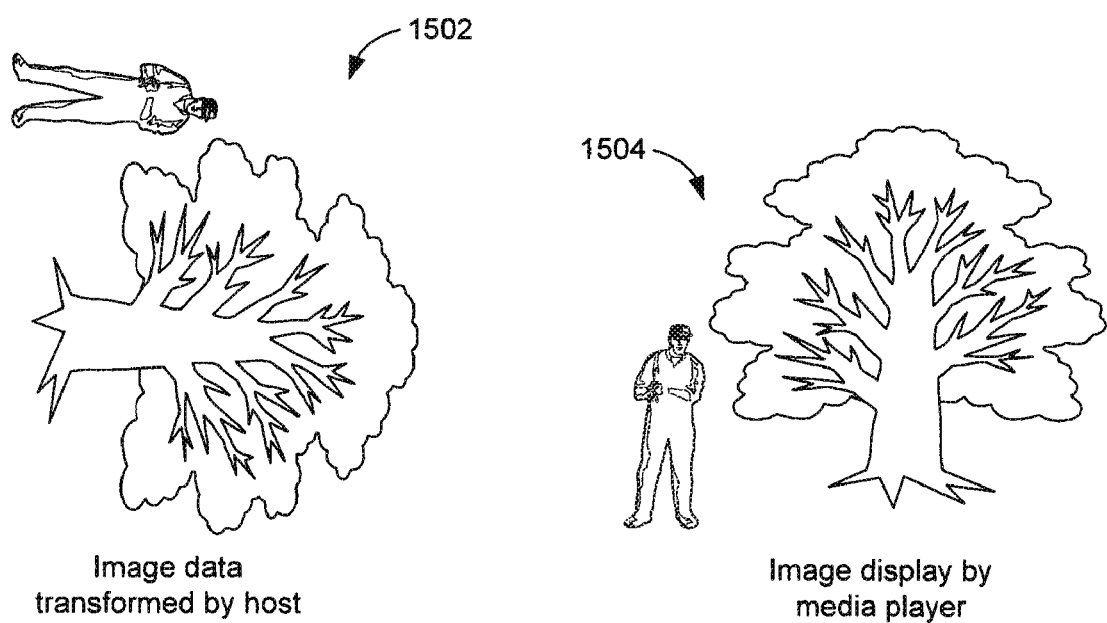
FIG. 15 illustrates an example of the FIG. 14 transformation, but with the image being pre-rotated by the host such that the resulting image is correctly oriented upon playback.

On the other hand, in FIG. 15, reference numeral 1502 denotes image data that has been transformed to be rotated clockwise by ninety degrees in the host before being provided to the media player. As a result, in the image display 1504, the image is properly displayed (equivalent to the untransformed image data 1402 in FIG. 14).

Other inherent image transformations may occur on the media player, and these inherent transformations may be accommodated for using preprocessing on the host. The inherent transformations that may be accommodated for in this manner are not limited to being related to image display but may, for example, be related to audio playback or other types of media playback.

Figure 7:
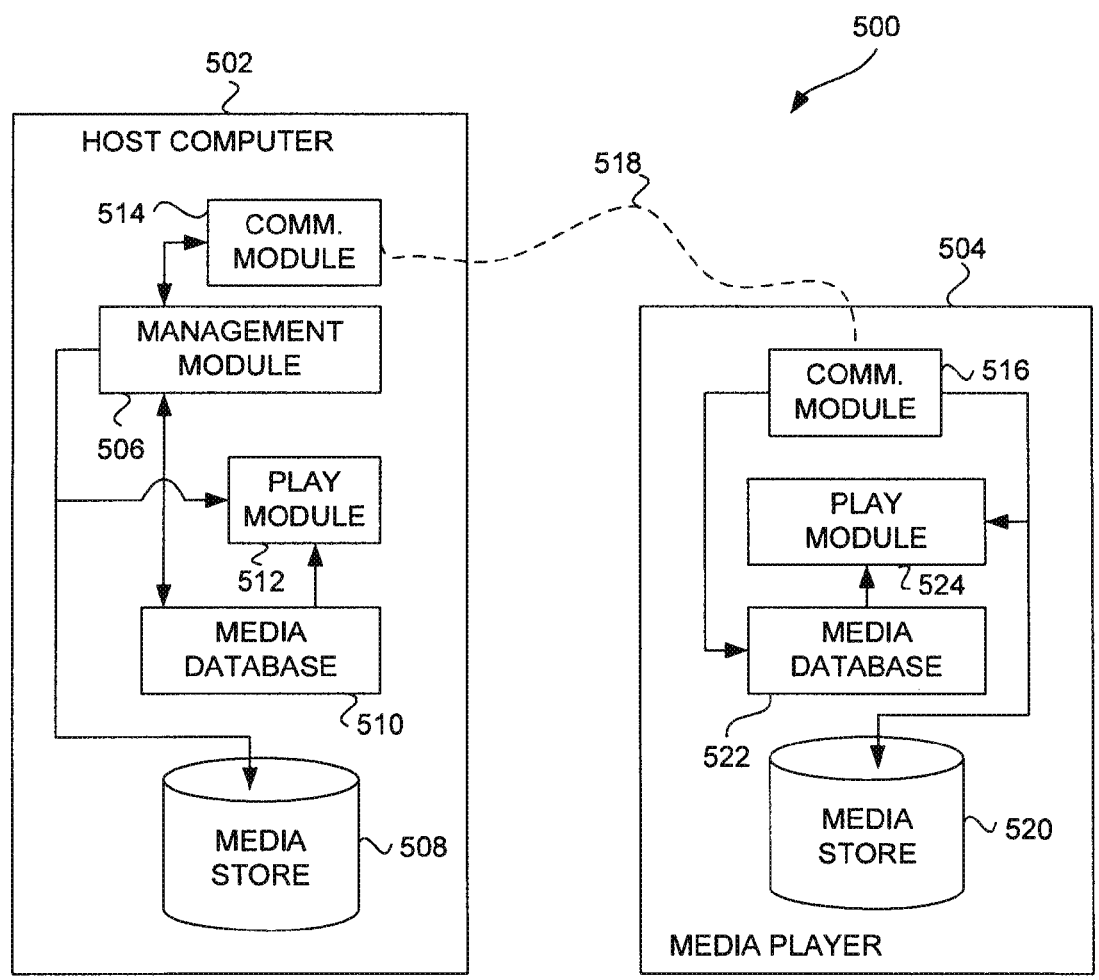
FIG. 7 is a block diagram of a media management system, in accordance with one embodiment of the present invention.

FIG. 7 is a block diagram of a media management system 500, in accordance with one embodiment of the present invention. The media management system 500 includes a host computer 502 and a media player 504. The host computer 502 is typically a personal computer. The host computer, among other conventional components, includes a management module 506, which is a software module. The management module 506 provides for centralized management of media items not only on the host computer 502 but also on the media player 504. More particularly, the management module 506 manages those media items stored in a media store 508 associated with the host computer 502. The management module 506 also interacts with a media database 510 to store media information associated with the media items stored in the media store 508.

The media items may correspond to audio, images or video items. The media information, on the other hand, pertains to characteristics or attributes of the media items. For example, in the case of audio or audiovisual media, the media information can include one or more of: title, album, track, artist, composer and genre. These types of media information are specific to particular media items. In addition, the media information can pertain to quality characteristics of the media items. Examples of quality characteristics of media items can include one or more of: bit rate, sample rate, equalizer setting, volume adjustment, start/stop and total time, etc.

Still further, the host computer 502 includes a play module 512. The play module 512 is a software module that can be utilized to play certain media items stored in the media store 508. The play module 412 can also utilize media information from the media database 510. Typically, the media information of interest corresponds to the media items to be played by the play module 512.

The host computer 502 also includes a communication module 514 that couples to a corresponding communication module 416 within the media player 504. A connection or link 518 removeably couples the communication modules 514 and 416. In one embodiment, the connection or link 518 is a cable that provides a data bus, such as a FIREWIRE™ bus or USB bus, which is well known in the art. In another embodiment, the connection or link 518 is a wireless channel or connection through a wireless network. Hence, depending on implementation, the communication modules 514 and 516 may communicate in a wired or wireless manner.

The media player 504 also includes a media store 520 that stores media items within the media player 504. The media items being stored to the media store 520 are typically received over the connection or link 518 from the host computer 502. More particularly, the management module 506 sends all or certain of those media items residing on the media store 508 over the connection or link 518 to the media store 520 within the media player 504. Additionally, the corresponding media information for the media items that is also delivered to the media player 504 from the host computer 502 can be stored in a media database 522. In this regard, certain media information from the media database 510 within the host computer 502 can be sent to the media database 522 within the media player 504 over the connection or link 518. Still further, lists identifying certain of the media items can also be sent by the management module 506 over the connection or link 518 to the media store 520 or the media database 522 within the media player 504.

Furthermore, the media player 504 includes a play module 524 that couples to the media store 520 and the media database 522. The play module 524 is a software module that can be utilized to play certain media items stored in the media store 520. The play module 524 can also utilize media information from the media database 422. Typically, the media information of interest corresponds to the media items to be played by the play module 524.

Hence, in one embodiment, the media player 504 has limited or no capability to manage media items on the media player 504. However, the management module 506 within the host computer 502 can indirectly manage the media items residing on the media player 504. For example, to "add" a media item to the media player 504, the management module 506 serves to identify the media item to be added to the media player 504 from the media store 508 and then causes the identified media item to be delivered to the media player 504. As another example, to "delete" a media item from the media player 504, the management module 506 serves to identify the media item to be deleted from the media store 508 and then causes the identified media item to be deleted from the media player 504. As still another example, if changes (i.e., alterations) to characteristics of a media item were made at the host computer 502 using the management module 506, then such characteristics can also be carried over to the corresponding media item on the media player 504. In one implementation, the additions, deletions and/or changes occur in a batch-like process during synchronization of the media items on the media player 504 with the media items on the host computer 502.

In another embodiment, the media player 504 has limited or no capability to manage playlists on the media player 504. However, the management module 506 within the host computer 502 through management of the playlists residing on the host computer can indirectly manage the playlists residing on the media player 504. In this regard, additions, deletions or changes to playlists can be performed on the host computer 502 and then by carried over to the media player 404 when delivered thereto.

As previously noted, synchronization is a form of media management. The ability to automatically initiate synchronization was also previously discussed. Still further, however, the synchronization between devices can be restricted so as to prevent automatic synchronization when the host computer and media player do not recognize one another.

According to one embodiment, when a media player is first connected to a host computer (or even more generally when matching identifiers are not present), the user of the media player is queried as to whether the user desires to affiliate, assign or lock the media player to the host computer. When the user of the media player elects to affiliate, assign or lock the media player with the host computer, then a pseudo-random identifier is obtained and stored in either the media database or a file within both the host computer and the media player. In one implementation, the identifier is an identifier associated with (e.g., known or generated by) the host computer or its management module and such identifier is sent to and stored in the media player. In another implementation, the identifier is associated with (e.g., known or generated by) the media player and is sent to and stored in a file or media database of the host computer.

Figure 8:
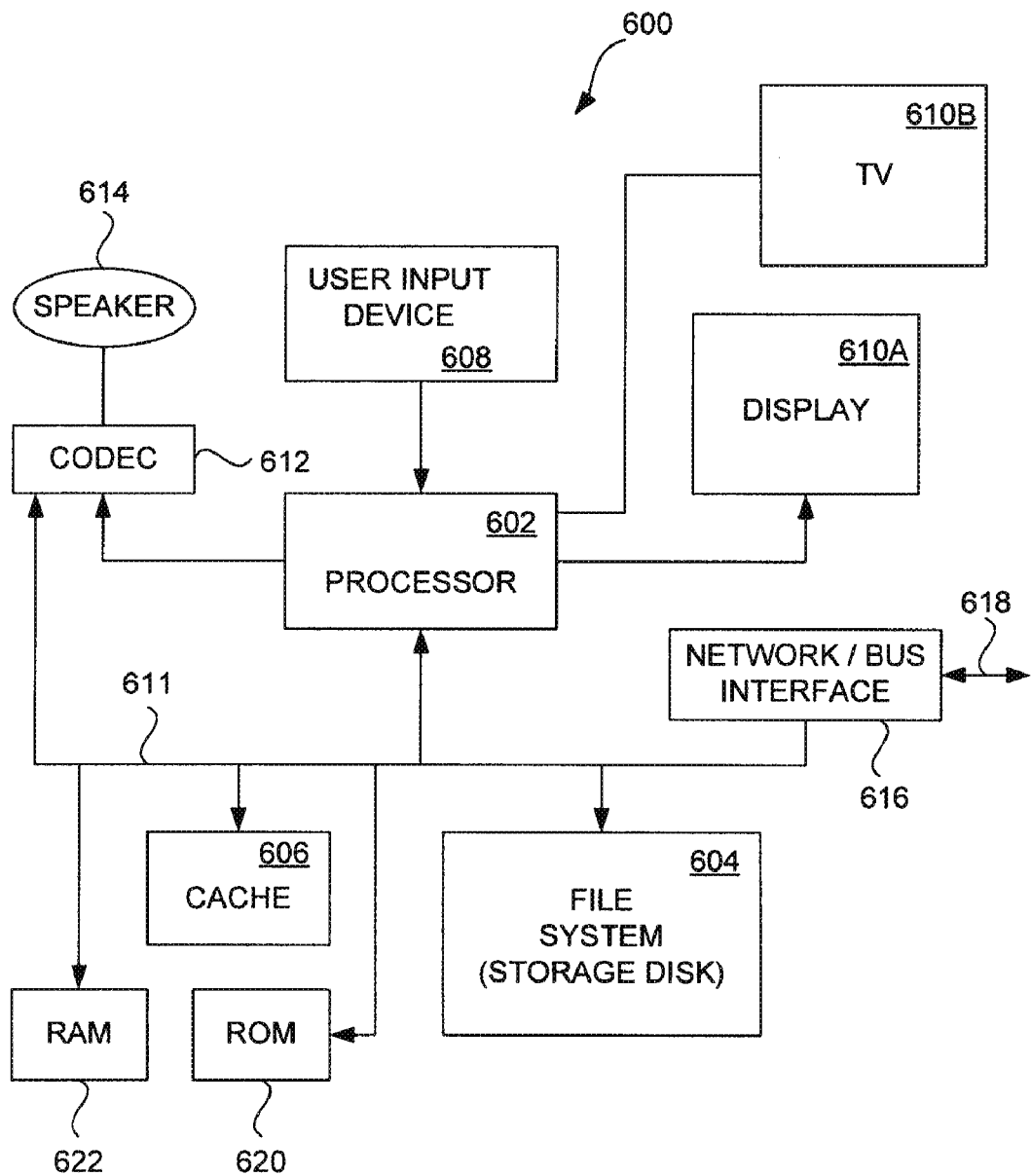
FIG. 8 is a block diagram of a media player, in accordance with one embodiment of the present invention.

FIG. 8 is a block diagram of a media player 600, in accordance with one embodiment of the present invention. The media player 600 includes a processor 602 that pertains to a microprocessor or controller for controlling the overall operation of the media player 600. The media player 600 stores media data pertaining to media items in a file system 604 and a cache 606. The file system 604 is, typically, a storage disk or a plurality of disks. The file system 604 typically provides high capacity storage capability for the media player 600. However, since the access time to the file system 604 is relatively slow, the media player 600 can also include a cache 606. The cache 606 is, for example, Random-Access Memory (RAM) provided by semiconductor memory. The relative access time to the cache 606 is substantially shorter than for the file system 604. However, the cache 506 does not have the large storage capacity of the file system 604. Further, the file system 504, when active, consumes more power than does the cache 606. The power consumption is often a concern when the media player 600 is a portable media player that is powered by a battery (not shown). The media player 600 also includes a RAM 620 and a Read-Only Memory (ROM) 622. The ROM 622 can store programs, utilities or processes to be executed in a non-volatile manner. The RAM 620 provides volatile data storage, such as for the cache 606.

The media player 600 also includes a user input device 608 that allows a user of the media player 600 to interact with the media player 600. For example, the user input device 608 can take a variety of forms, such as a button, keypad, dial, etc. Still further, the media player 600 includes a display 610 (screen display) that can be controlled by the processor 602 to display information to the user. A data bus 611 can facilitate data transfer between at least the file system 604, the cache 606, the processor 602, and the CODECs 612.

In one embodiment, the media player 600 serves to store a plurality of media items in the file system 604. The media items may for example correspond to audio (e.g., songs, books), images (e.g., photos) or videos (e.g., movies). When a user desires to have the media player play a particular media item, a list of available media items is typically displayed on the display 610. Then, using the user input device 608, a user can select one of the available media items. The processor 602, upon receiving a selection of a particular media item, supplies the media data (e.g., audio file, image file or video file) for the particular media item to the appropriate device. For audio items, the processor supplies the media item to a coder/decoder (CODEC) 612. The CODEC 612 then produces analog output signals for a speaker 614. The speaker 614 can be a speaker internal to the media player 600 or external to the media player 600. For example, headphones or earphones that connect to the media player 600 would be considered an external speaker.

For visual items, the processor supplies the media item to the display 610. The display may for example be a liquid crystal display (LCD) that is integral with the media player. Alternatively, the display may be an external display such as a CRT or LCD, or a television of any particular type. In some cases, the processor is configured to supply media data to both an integrated display and an external display. In cases such as this, the media data displayed on both displays may be the same of it may be different. In the later case, for example, the internal display may include a slide show interface showing the previous image, the next image and the image currently being displayed on the external display.

The media player 600 also includes a network/bus interface 616 that couples to a data link 618. The data link 618 allows the media player 600 to couple to a host computer. The data link 618 can be provided over a wired connection or a wireless connection. In the case of a wireless connection, the network/bus interface 616 can include a wireless transceiver.

In another embodiment, a media player can be used with a docking station. The docking station can provide wireless communication capability (e.g., wireless transceiver) for the media player, such that the media player can communicate with a host device using the wireless communication capability when docked at the docking station. The docking station may or may not be itself portable.

The wireless network, connection or channel can be radio-frequency based, so as to not require line-of-sight arrangement between sending and receiving devices. Hence, synchronization can be achieved while a media player remains in a bag, vehicle or other container.

The host device can also be a media player. In such case, the synchronization of media items can between two media players.

The various aspects, embodiments, implementations or features of the invention can be used separately or in any combination.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

Figure 9:
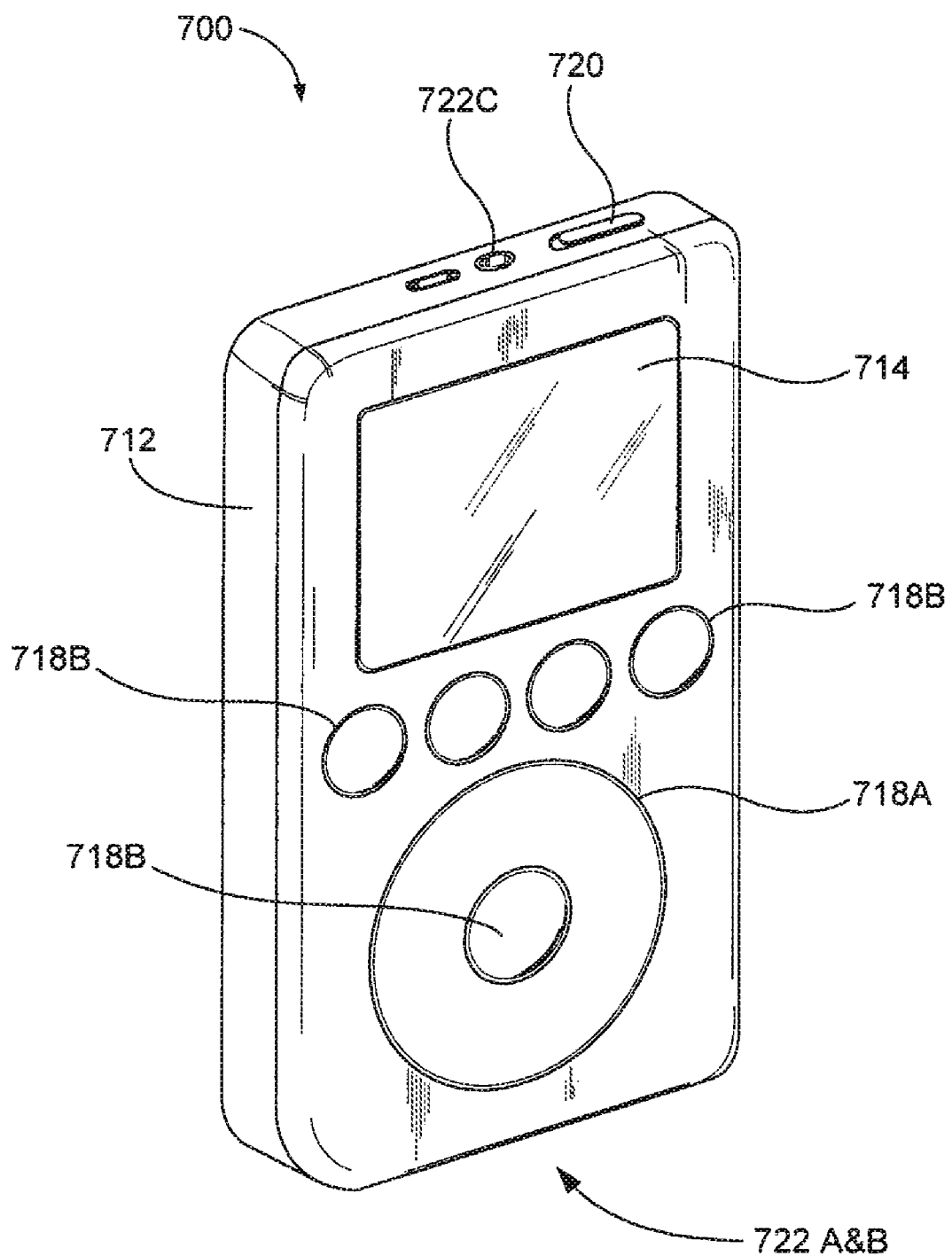
FIG. 9 is perspective view of a handheld computing device, in accordance with one embodiment of the present invention.

FIG. 9 is perspective view of a handheld computing device 700, in accordance with one embodiment of the present invention. The computing device 700 is capable of processing data and more particularly media such as audio, video, images, etc. By way of example, the computing device 700 may generally correspond to a music player, game player, video player, camera, cell phone, personal digital assistant (PDA), and/or the like. With regards to being handheld, the computing device 700 can be operated solely by the user's hand(s), i.e., no reference surface such as a desktop is needed. In some cases, the handheld device is sized for placement into a pocket of the user. By being pocket sized, the user does not have to directly carry the device and therefore the device can be taken almost anywhere the user travels (e.g., the user is not limited by carrying a large, bulky and heavy device).

As shown, the computing device 700 includes a housing 712 that encloses and supports internally various electrical components (including integrated circuit chips and other circuitry) to provide computing operations for the device. The integrated circuit chips and other circuitry may include a microprocessor, memory, a battery, and various input/output (I/O) support circuitry. In most cases, the microprocessor executes instructions and carries out operations associated with the computing device. For example, using instructions retrieved for example from memory, the microprocessor may control the reception and manipulation of input and output data between components of the computing device 700. In fact, the microprocessor may work with an operating system to execute computer code and produce and use data stored in memory. By way of example, the memory may include a hard drive, flash memory, Read-Only Memory (ROM), Random-Access Memory (RAM) and/or the like.

The computing device 700 also includes a display 714. The display 714, which is assembled within the housing 712 and which is visible through an opening in the housing 712, is used to display a graphical user interface (GUI) as well as other information to the user (e.g., text, objects, graphics). The display 714 generally takes the form of a flat panel display such as a liquid crystal display (LCD).

The computing device 700 also includes one or more input devices 718 configured to transfer data from the outside world into the computing device 700. The input devices 718 may for example be used to perform tracking/scrolling, to make selections or to issue commands in the computing device 700. By way of example, the input devices 718 may correspond to keypads, joysticks, touch screens, touch pads, track balls, wheels, buttons, switches, and/or the like. In the illustrated embodiment, the computing device 700 includes a touch pad 718A and a plurality of buttons 718B, which are assembled within the housing 712 and which are accessible through openings in the housing 712.

The computing device 700 may include one or more switches 720 including power switches, hold switches, and the like. Furthermore, the device 700 may include one or more connectors 722 including data ports and power terminals 722A and B, as well as audio and/or video jacks 722C.

In the illustrated embodiment, the computing device 700 is a pocket sized hand held music/photo player that allows a user to store a large collection of music and photos, and to listen to this music and view the photos on the go (e.g., while working, traveling, exercising, etc.). In such a case, the memory may contain media management software having both music playing and photo displaying capabilities. Furthermore, the GUI may visually provide music and photo menus, as well as music and photo controls to the user. Moreover, the touch pad may provide scrolling functions, which allow a user to traverse through menus or controls on the GUI as well as to browse through a list of songs or photos, and the buttons may provide button functions that open a menu, play a song, display a photo, fast forward through a song, seek through a playlist or album and/or the like. In addition, the music/photo player typically includes an audio jack for outputting audio, a video jack for outputting photos and videos and a data port for transmitting and receiving media data (and other data) to and from a host device. In some cases, the audio and video jack are combined into a single jack. By way of example, the music photo player may correspond to the iPod® series music players manufactured by Apple Computer of Cupertino, Calif.

Figure 10:
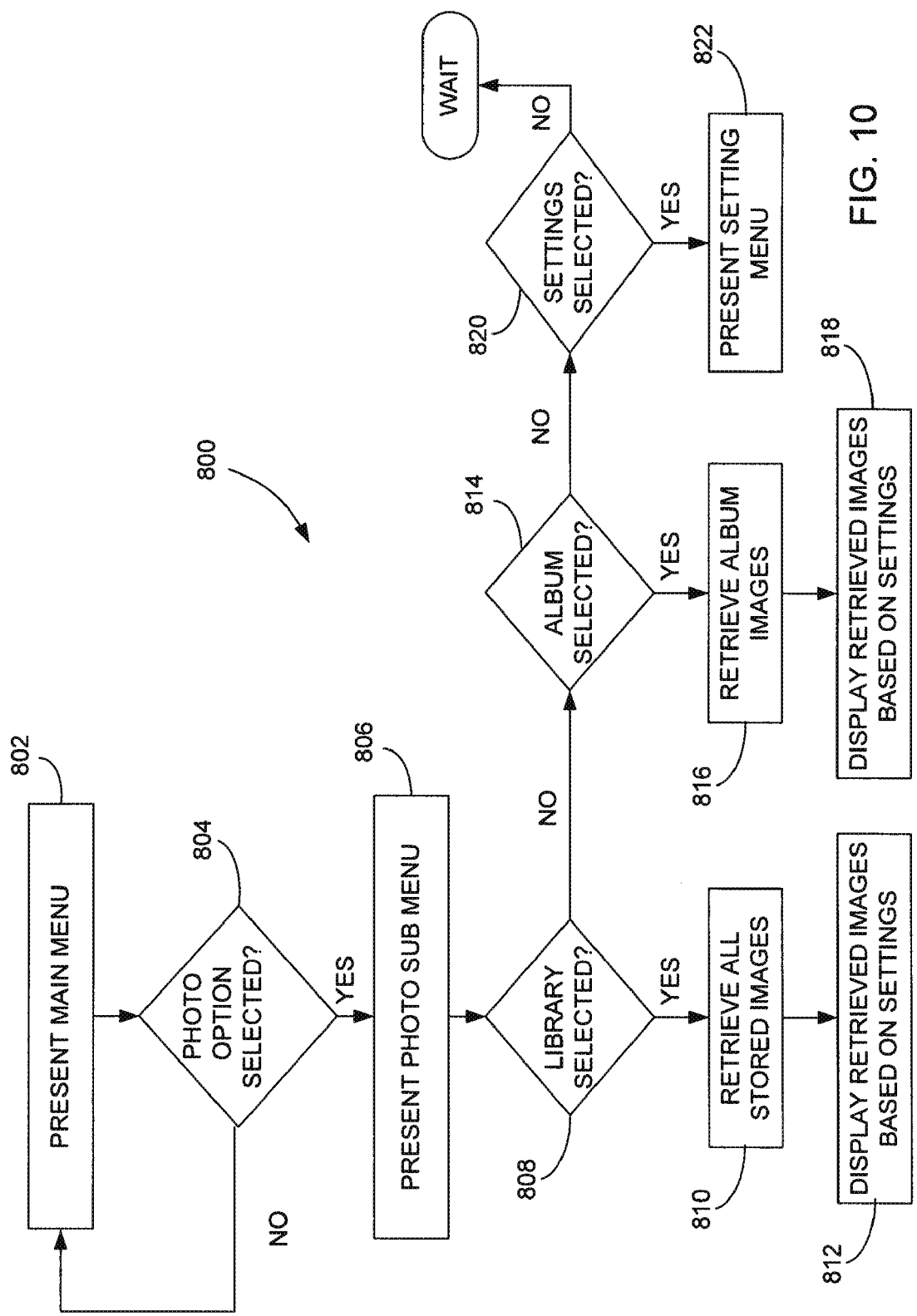
FIG. 10 is a media device operational method, in accordance with one embodiment of the present invention.

FIG. 10 is a media device operational method 800, in accordance with one embodiment of the present invention. The operational method 800 may for example be performed on a portable media device, and more particularly a portable music/photo player. The method 800 generally begins at block 802 where a main menu is presented to a user on a display. See for example FIG. 11A, which shows the main menu 850 presented on the display. The main menu 850 generally includes several options 852 associated with operating the media device. By way of example, the main menu 850 may include options 852 such as music, photos, extras, settings, shuffle songs and backlight. In most cases, each of the options 852 includes its own sub menu of sub options, which are associated with the main option. Each of these sub options may open another sub menu of sub options or they may initiate an action. By way of example, the music sub-menu may include music library, playlist, and browse options and the photo sub menu may include photo library, album and slide show setting options Following block 802, the method proceeds to block 804 where a determination is made as to whether the photo option was selected. If not, the method waits or proceeds back to block 802. If so (as shown by the slider bar in FIG. 11A), the method proceeds to block 806 where the photo sub menu is presented to the user on the display. By way of example, see FIG. 11B which shows the photo sub menu 854 presented on the display. The photo sub menu 854 may include one or more photo options 856, which may represent different modes of photo viewing, and which may give the user the ability to change settings associated with photo viewing. In the illustrated embodiment, the sub menu 854 includes a photo library option, one or more album options and a photo settings options.

Following block 806, the method proceeds to block 808 where a determination is made as to whether or not the library option is selected. If the library option is selected, the method proceeds to block 810 where all the stored images are retrieved. Thereafter, in block 812, the images are displayed based on predetermined settings. If the library is not selected, the method proceeds to block 814 where a determination is made as to whether or not the album option is selected. If the album option is selected, the method proceeds to block 816 where only the album images are retrieved. Thereafter, in block 818, the images are displayed based on predetermined settings.

In either of blocks 812 and 818, the entire group or some portion of the retrieved group can be displayed. The amount displayed generally depends on the number of images inside the library or album. If it is large, the screen may not be capable of displaying all of the images at once. In cases such as these, some of the images are kept out of the viewing area until the user decides to pull them up. The manner in which they are displayed generally depends on the desired display configuration established in the settings menu.

Figure 11A:
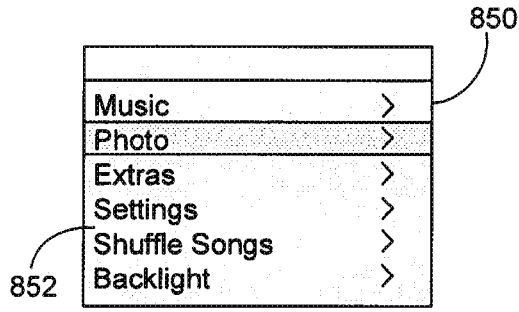
FIGS. 11A-11E are diagrams of several exemplary screen shots of a media player with photo viewing capabilities, in accordance with several embodiments of the present invention.
Figure 11B:
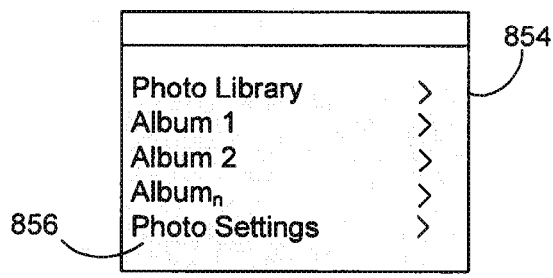
Figure 11C:
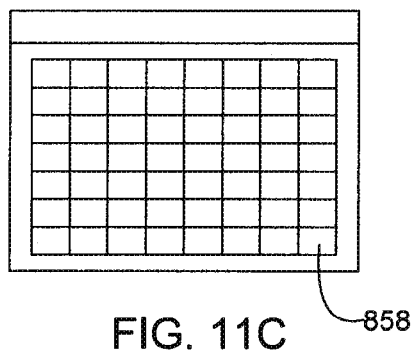
Figure 11D:
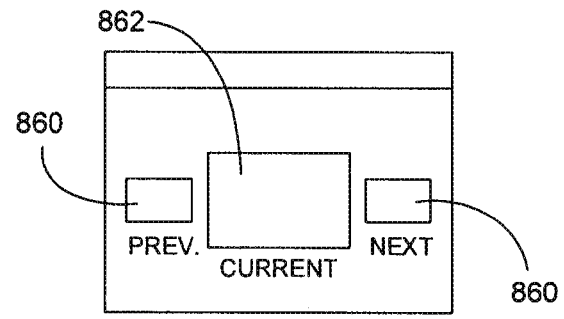
Figure 11E:
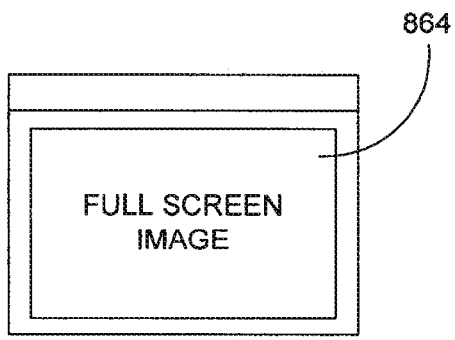

In browse mode, a large group of tiny thumbnails 858 are displayed in columns and rows as shown in FIG. 11C. The user can browse through the tiny thumbnails 858 via a scrolling action either image by image or row by row or column by column, etc. As the user scrolls through the images a new set of data (e.g., images or line of images) is brought into view in the viewing area. In most cases, once the viewing area is full, each new set of data appears at the edge of the viewing area and all other sets of data move over one position. That is, the new set of data appears for each set of data that moves out of the viewing area. In some cases, when a particular image is selected while browsing, the full screen version of that image is displayed as shown in FIG. 11E. Alternatively, the configuration shown in FIG. 11D may be displayed with the current image being the medium thumbnail of the image selected, and the previous and next images being the small thumbnails of the images located next to the image selected.

In slide show mode, only the previous, current, and next images are displayed. The previous and next images may be small thumbnails 860 while the current image may be a medium thumbnail 862 as shown in FIG. 11D. The user may traverse through the retrieved images by clicking a forward or back button, i.e., the forward button causes the current image to move to the previous image, the next image to move to the current image, and a new image to move into the next image. In some cases, when a the current image is selected while traversing through the slide show, the full screen version 864 of that image is displayed as shown in FIG. 11E.

Figure 11F:
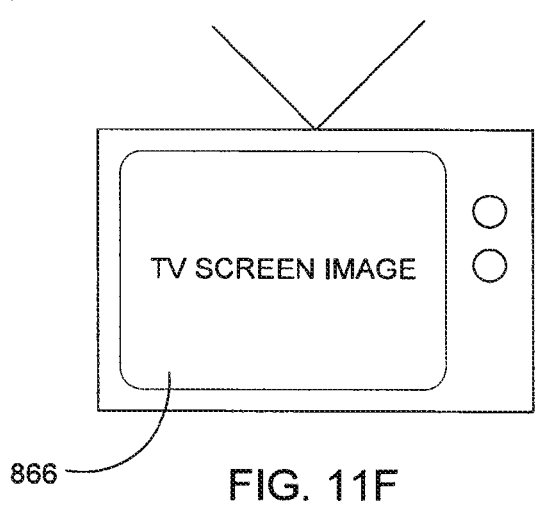
FIG. 11F is a diagram of a pictorial of a TV screen image provided by a television coupled to the media player, in accordance with one embodiment of the present invention.

In TV mode, the TV thumbnail(s) 866 is outputted to a TV for display as shown in FIG. 11F. The TV display may mimic what is being shown on the media player. For example, the TV display may display any of the previous screen shots (FIGS. 11C, 11D, 11E) or variations thereof. During a slide show, for example, the TV screen image may be based on the same original image as the current image in the slide show window.

If the album option is not selected, the method proceeds to block 820 where a determination is made as to whether or not the setting option is selected. If the setting option is selected, the method proceeds to block 822 where a setting menu is presented to the user on the display. The setting menu may include control settings pertaining to one or more display events. In fact, the setting menu may serve as a control panel for reviewing and/or customizing the control settings, i.e., the user may quickly and conveniently review the control settings and make changes thereto. Once the user saves the changes, the modified control settings will be employed to handle future display events. By way of example, the settings may include features that allow a user to assign music tracks to albums, to turn the assigned music on/off, to turn TV out on/off, to choose between modes, etc. The settings may also allow a user to select slide shows and whether to display the images in full screen or slide show mode and whether to show the images in random or sequenced order as well as to end or repeat when finished.

Figure 12:
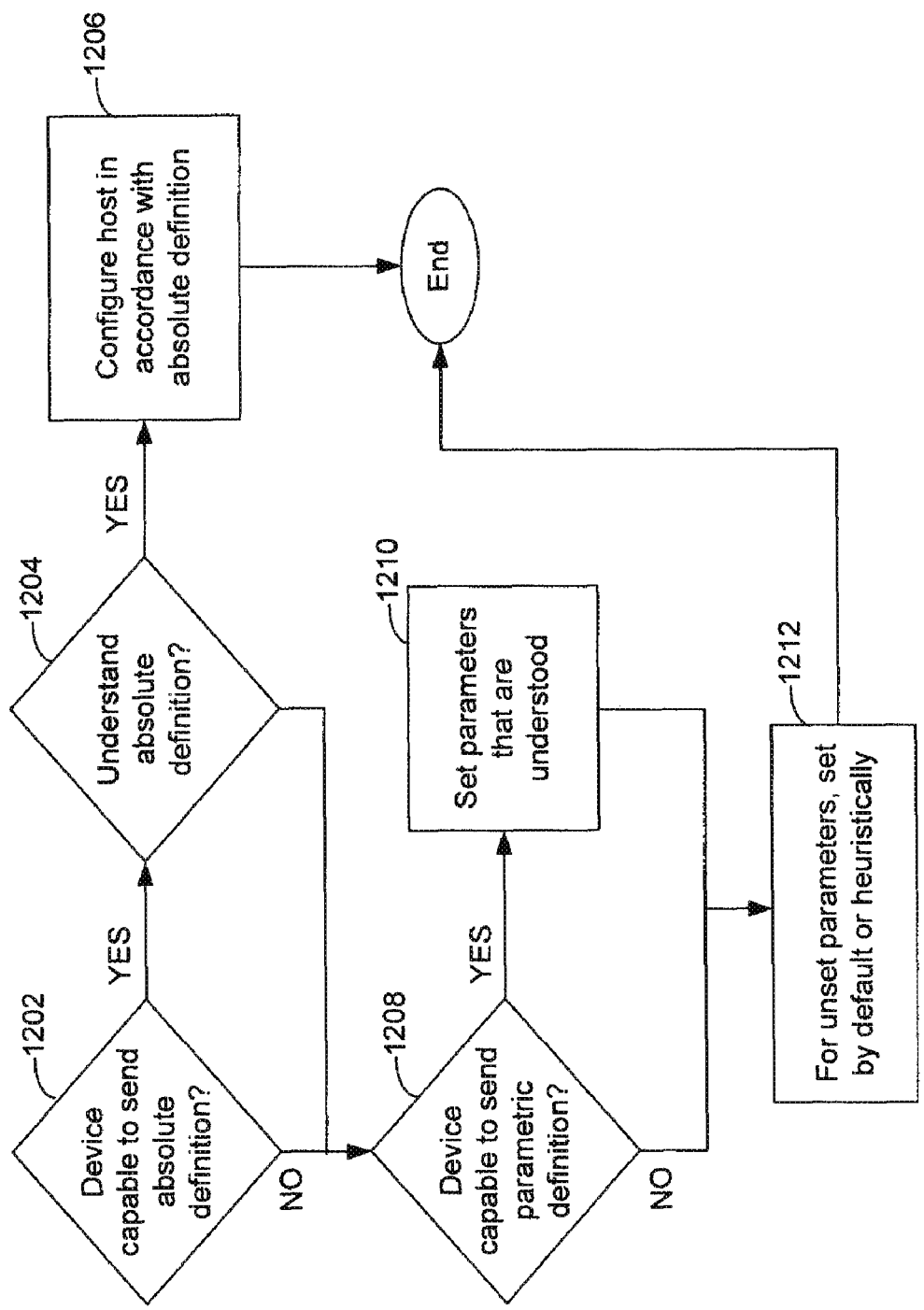
FIG. 12 is a flowchart illustrating a method to configure a host device to interoperate with a portable media player.

Earlier in this description, with reference to FIG. 1 (with particular reference to step 104 in the FIG. 1 flowchart), it is discussed how an image profile is generated in the host device. With reference to FIG. 12, we now describe an example of how, more generally, the host device is configured for interoperation with a particular media player.

At step 1202, it is determined if the media player is able to provide the host with an absolute definition of the device's capabilities. That is, it is determined if the media player is able to provide an identifier or other absolute definition to the host. For example, the host may be able to match the identifier to a media player capability table (generally, a collection of data regarding device capabilities) either stored within the host or accessible to the host (e.g., via the Internet or other network). The identifier may be a device serial number, identification of a family of media players with common capabilities (from the point of view of the host device, at least), or other identifier.

If it is determined at step 1202 that the media player is able to provide the host with an absolute definition of the media player's capabilities, then at step 1204, it is determined whether the host device can understand the absolute definition. That is, it is determined if the host device can access a valid (or, at least, what appears to be valid) player capabilities definition corresponding to the absolute definition. If so, at step 1206, the host is configured for interoperation with the media player in accordance with the accessed device capabilities definition.

Otherwise, if it is determined at step 1202 that media player is not able to provide the host with an absolute definition of the media player's capabilities, or if it is determined at step 1204 that the host cannot understand an absolute definition that is provided by the media player to the host, then it is determined at step 1208 whether the media player can send a parametric definition of the media player's capabilities. If so, then the host receives the parametric definition at step 1210 and sets those parameters that are understood.

For example, the definition may use key/value pairs, using Extensible Markup Language (XML) or a similar markup language, as shown in Appendix A. As another example, a simpler tagged text format may be utilized, as also shown in Appendix A.

Step 1212 is reached after either step 1208 (in which it is determined that the media player cannot send a parametric definition of the media player's capabilities) or step 1210 (in which the host receives the parametric definition and sets those parameters that are understood). At step 1212, the host determines which capabilities have not been configured (either as a result of the media player not being able to send a parametric definition—step 1208) or the host not being able to understand some of the received parameters—step 1210) and determines a value for those non-configured parameters. For example, the host determines the value for the non-configured parameters by using either a default value, or by heuristically or otherwise determining the value of the non-configured parameters.

In addition to generating an image profile (or other characterization of media handling capabilities of the media player), a process similar to that described above with reference to FIG. 12 may be employed in cooperation with a process to update processing of the media player. In one example, the process to update processing of the media player accomplishes loading of latest "system" software to the media player.

In one particular example, a process similar to that described above with reference to FIG. 12 is employed to determine characteristics of the media player, in order to determine if there is more appropriate system software available for use by the media player. Such a process is described with reference to FIG. 13.

At step 1302, the host determines characteristics of the media player using, for example, a process similar to that described above with reference to FIG. 12. At step 1304, the host determines whether there is "more appropriate" system software available for the media player having the host-determined characteristics. By "more appropriate," it is meant, for example, that for media players having the characteristics of the attached media player, a new version of system software has been developed (e.g., to provide greater capability or to fix bugs).

Figure 13:
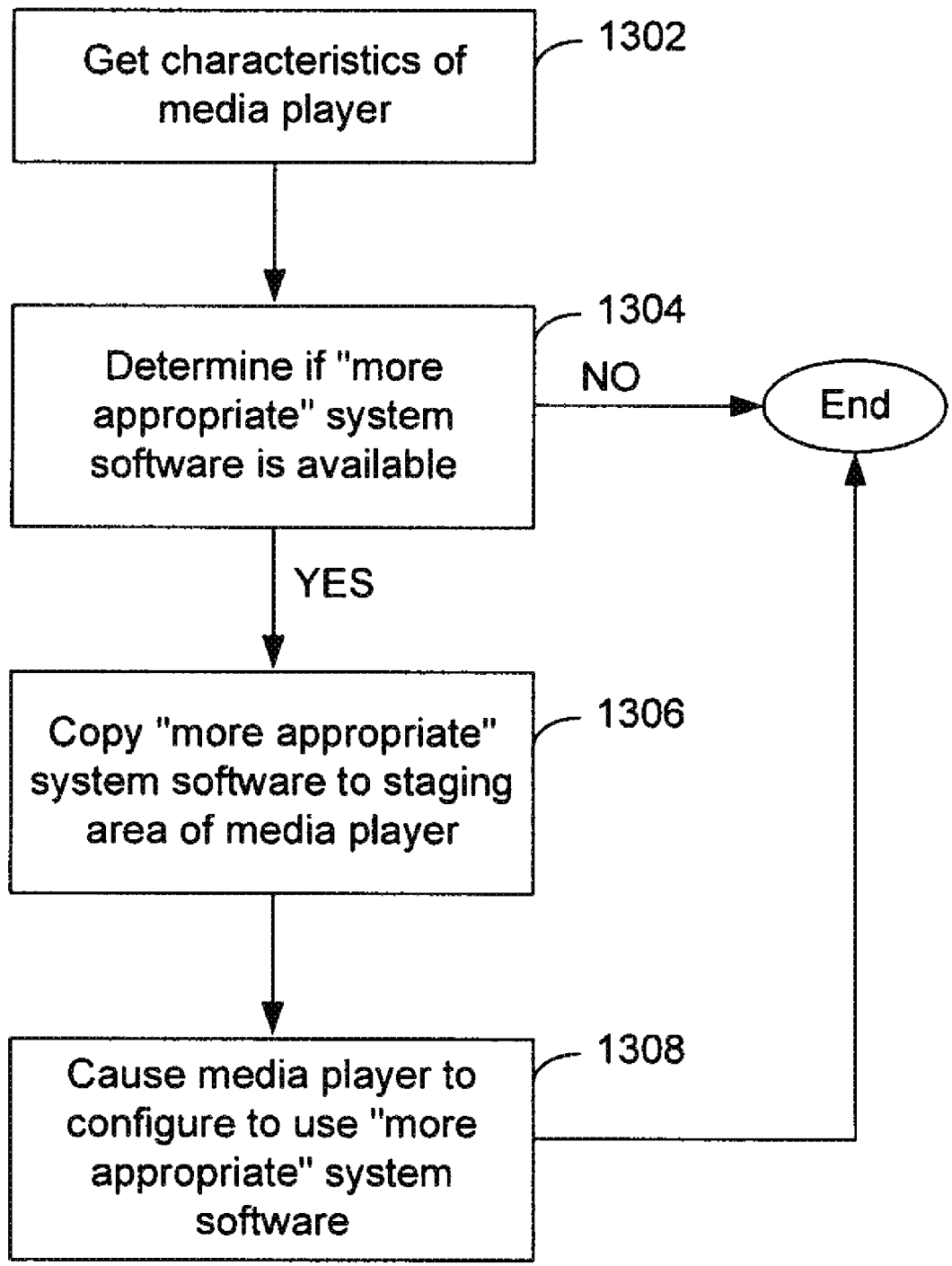
FIG. 13 is a flowchart illustrating a method operating on the host device to configure the portable media player to use updated system software.

If it is determined at step 1302 that there is not more appropriate system software available for the media player, then the FIG. 13 processing ends. Otherwise, the host causes the media player to be configured to use the more appropriate system software.

One example of the host causing the media player to be configured to use the more appropriate system software is described with reference to steps 1306 and 1308 of the FIG. 13 flowchart. At step 1306, the more appropriate system software is caused by the host, in cooperation with the media player, to be copied to a staging area of the media player. In one example, the staging area is a particular partition of a disk drive of the media player.

At step 1308, the media player is caused to be configured to use the more appropriate system software that was copied to the staging area of the media player. For example, the media player may be caused to reboot, which causes the more appropriate system software to be copied from the staging area of the media player to flash memory of the media player. In this way, upon subsequent boot up of the media player, the media player is configured to use the more appropriate system software. The media player may be caused to boot again such that the media player is configured to immediately use the more appropriate system software.

While this invention has been described in terms of several preferred embodiments, there are alterations, permutations, and equivalents, which fall within the scope of this invention. It should also be noted that there are many alternative ways of implementing the methods and apparatuses of the present invention. For example, although the invention is primarily directed at images, it should be noted that it may also be applied to music. In the case of music, different versions of the same song may be created, downloaded and stored. The different versions can be based on a variety of things including for example adjustments made to characteristics of the song (e.g., tempo, pitch), adding or removing elements of the song (e.g., voice or instrument), and/or the like. It is therefore intended that the following appended claims be interpreted as including all such alterations, permutations, and equivalents as fall within the true spirit and scope of the present invention.

What is claimed is:

1. A method of operating a host to which a portable media player device is coupled for communication and interoperation therewith, comprising:
   receiving, from the portable media player device, particular parameters characterizing the portable media player device; and
   configuring the operations carried out by the host according to the received particular parameters to communicate and interoperate with the portable media player device.

2. The method of claim 1, wherein:
   the host communicating and interoperating with the portable media player device includes processing and providing media to the portable media player device for playback thereon.

3. The method of claim 2, wherein:
   the received particular parameters characterizing the portable media player device include particular parameters characterizing the playback of media by the portable media player device.

4. The method of claim 2, wherein:
   the host operating according to the received particular parameters includes processing the media provided to the portable media player device based on the received particular parameters.

5. The method of claim 4, wherein:
   the received parameters characterizing the playback of media by the portable media player device includes particular parameters characterizing a transformation inherent in the playback of media by the portable media player device.

6. The method of claim 5, wherein:
   configuring the media provided to the portable media player device based on the received particular parameters includes transforming the media such that the transformation inherent in the playback of media by the portable media player device yields no substantial net effect.

7. The method of claim 1, wherein:
   receiving, from the portable media player device, particular parameters characterizing the portable electronic media player device includes receiving the particular parameters as values associated with metadata corresponding to a meaning of the values.

8. The method of claim 7, wherein:
   the step of operating the host software according to the received particular parameters includes processing the metadata to determine the meanings of the values.

9. The method of claim 8, wherein:
   processing the metadata to determine the meanings of the values includes, if the meanings of the values cannot be determined, performing processing other than processing the metadata to configure the host for communication and interoperation with the media player.

10. The method of claim 9, wherein:
    the processing other than processing the metadata to configure the host for communication and interoperation with the media player is in addition to processing the metadata for values the meanings of which can be determined.

11. The method of claim 6, wherein:
    the media includes images; and
    the transformation inherent in the playback of media by the portable media player device includes inherent rotation of the images.

12. The method of claim 11, wherein:
    transforming the media such that the transformation inherent in the playback of media by the portable media player device yields no substantial net effect includes rotating at least one image by an amount opposite to an amount by which the portable media player device inherently rotates the images.

13. The method of claim 1, wherein:
    operating the host in accordance with the received particular parameters to communicate and interoperate with the media player includes providing updated system software to the portable media player device.

14. A method of transferring image data between a host device and a portable media device, the portable media device being capable of operating to store and play media items, the method comprising:
    at the host device, based on an indication of an inherent transformation of media by the portable media device during operation, transforming the media to counteract the inherent transformation of media; and
    providing the transformed media to the portable media device.

15. The method of claim 14, wherein:
    the media is an image.

16. The method of claim 15, wherein:
    the inherent transformation of media by the portable media device during operation is an inherent rotation of image media during playback of the image media.

17. The method of claim 16, wherein:
    the inherent rotation of image media during playback of the image media is caused by an orientation of a display screen being different from an orientation at which image data provided to the display screen is displayed unrotated.

18. A method of operating a host to which a portable media player device is coupled for communication and interoperation therewith, comprising:
    receiving particular parameters characterizing playback of media by the portable media player device from the portable media player device; and
    operating the host according to the received particular parameters to communicate and interoperate with the portable media player device that includes providing media to the portable media player device for processing based on the received particular parameters and for playback thereon, wherein the received parameters characterizing the playback of media by the portable media player device includes particular parameters characterizing a transformation inherent in the playback of media by the portable media player device, and wherein configuring the media provided to the portable media player device based on the received particular parameters includes transforming the media such that the transformation inherent in the playback of media by the portable media player device yields no substantial net effect wherein when the media includes images, the transformation inherent in the playback of media by the portable media player device includes inherent rotation of the images.

19. The method of claim 18, wherein:
the received particular parameters characterizing the portable media player device include particular parameters characterizing the playback of media by the portable media player device.

20. The method of claim 18, wherein:
receiving, from the portable media player device, particular parameters characterizing the portable electronic apparatus includes receiving the particular parameters as values associated with metadata corresponding to a meaning of the values.

21. The method of claim 20, wherein:
the step of operating the host software according to the received particular parameters includes processing the metadata to determine the meanings of the values.

22. The method of claim 21, wherein:
processing the metadata to determine the meanings of the values includes, if the meanings of the values cannot be determined, performing processing other than processing the metadata to configure the host for communication and interoperation with the media player.

23. The method of claim 22, wherein:
the processing other than processing the metadata to configure the host for communication and interoperation with the media player is in addition to processing the metadata for values the meanings of which can be determined.

24. A method of transferring image data between a host device and a portable media device, the portable media device being capable of operating to store and play media items, the method comprising:
at the host device, based on an indication of an inherent transformation of media by the portable media device during operation, transforming the media to counteract the inherent transformation of media; and
providing the transformed media to the portable media device, wherein when the media is an image, the inherent transformation of media by the portable media device during operation is an inherent rotation of image media during playback of the image media.

25. The method of claim 24, wherein:
the inherent rotation of image media during playback of the image media is caused by an orientation of a display screen being different from an orientation at which image data provided to the display screen is displayed unrotated.

26. A host device, comprising:
a processor arranged to
receive particular parameters characterizing playback of media by a portable media player device from a portable media player device in communication with the host device; and
operate the host according to the received particular parameters to communicate and interoperate with the portable media player device that includes providing media to the portable media player device for processing based on the received particular parameters and for playback thereon, wherein the received parameters characterizing the playback of media by the portable media player device includes particular parameters characterizing a transformation inherent in the playback of media by the portable media player device, and wherein configuring the media provided to the portable media player device based on the received particular parameters includes transforming the media such that the transformation inherent in the playback of media by the portable media player device yields no substantial net effect wherein when the media includes images, the transformation inherent in the playback of media by the portable media player device includes inherent rotation of the images.

27. The host device of claim 26, wherein:
the received particular parameters characterizing the portable media player device include particular parameters characterizing the playback of media by the portable media player device.

28. The host device of claim 26, wherein:
receiving, from the portable media player device, particular parameters characterizing the portable electronic apparatus includes receiving the particular parameters as values associated with metadata corresponding to a meaning of the values.

29. The host device of claim 28, wherein:
the step of operating the host software according to the received particular parameters includes processing the metadata to determine the meanings of the values.

30. The host device of claim 29, wherein:
processing the metadata to determine the meanings of the values includes, if the meanings of the values cannot be determined, performing processing other than processing the metadata to configure the host for communication and interoperation with the media player.

31. A method of operating a host to which a portable media player is coupled for communication and interoperation therewith, comprising:
receiving, from the portable media player, an absolute definition of the portable media player's capabilities that can include characterizing the operation of the portable media player;
determining if the host can access a valid portable media player capabilities definition based on the absolute definition provided to the host by the portable media player, wherein if the host can access the valid portable media player capabilities definition, then configuring the host to interoperate with the portable media player based upon the accessed valid portable media player capabilities definition, otherwise
receiving a parametric definition of the portable media player's capabilities; and
setting the operation of the host according to those parameters that are understood by the host.

32. The method of claim 31, wherein:
wherein the absolute definition provided to the host by the portable media player includes a portable media player identifier.

33. The method of claim 31, wherein determining if the host can access a valid portable media player capabilities definition based on the absolute definition provided to the host by the portable media player, comprises:
matching an identifier to a media player capability table.

34. The method as recited in claim 33, wherein the media player capability table comprises a collection of data regarding capabilities of the portable media player.

35. The method as recited in claim 34, wherein the media player capability table is either stored within the host or accessible to the host via the Internet or other network.

36. The method of claim 31, wherein the received parametric definition of the portable media player's capabilities include particular parameters characterizing the playback of media by the portable media player.

37. The method of claim 31, wherein the setting the operation of the host according to those parameters that are understood by the host includes processing media provided to the portable media player device by the host based on the received particular parameters.

38. The method as recited in claim 37, wherein the received parameters characterizing playback of media by the portable media player device includes particular parameters characterizing a transformation inherent in the playback of media by the portable media player device.

* * * * *

UNITED STATES PATENT AND TRADEMARK OFFICE
CERTIFICATE OF CORRECTION

| | | |
|---|---|---|
| PATENT NO. | : 7,706,637 B2 | Page 1 of 1 |
| APPLICATION NO. | : 11/535646 | |
| DATED | : April 27, 2010 | |
| INVENTOR(S) | : Greg Marriott | |

It is certified that error appears in the above-identified patent and that said Letters Patent is hereby corrected as shown below:

On page 3, under "U.S. Patent Documents", in column 1, line 31, delete "IIua" and insert -- Hua --, therefor.

On page 4, under "Other Publications", in column 1, line 52, delete "Motorla" and insert -- Motorola --, therefor.

On page 5, under "Other Publications", in column 1, line 48, delete "Pervasice" and insert -- Pervasive --, therefor.

On Sheet 2 of 12, in Figure 3, Element 308, line 1, delete "COLECTION" and insert -- COLLECTION --, therefor.

In column 4, line 12, delete "an a" and insert -- a --, therefor.

In column 18, line 12, after "options" insert -- . --.

In column 19, line 6, delete "a the" and insert -- the --, therefor.

Signed and Sealed this
Eighth Day of November, 2011

David J. Kappos
*Director of the United States Patent and Trademark Office*